US008905342B2

(12) United States Patent
Gushwa

(10) Patent No.: US 8,905,342 B2
(45) Date of Patent: Dec. 9, 2014

(54) FOOD PROCESSING DEVICE WITH LID MOUNTED ADJUSTMENT MECHANISM

(75) Inventor: David Joseph Gushwa, Mishawaka, IN (US)

(73) Assignee: Whirlpool Corporation, Benton Harbor, MI (US)

(*) Notice: Subject to any disclaimer, the term of this patent is extended or adjusted under 35 U.S.C. 154(b) by 449 days.

(21) Appl. No.: 13/307,305

(22) Filed: Nov. 30, 2011

(65) Prior Publication Data

US 2013/0134245 A1 May 30, 2013

(51) Int. Cl.
*A47J 43/046* (2006.01)
(52) U.S. Cl.
USPC .......................................................... 241/92
(58) Field of Classification Search
CPC ...................................................... A47J 43/046
USPC ................................. 241/92, 100, 37; 99/537
See application file for complete search history.

(56) References Cited

U.S. PATENT DOCUMENTS

| | | | |
|---|---|---|---|
| 2,480,717 A | 8/1949 | Dodegge | |
| 3,704,736 A | 12/1972 | Pratley | |
| 4,283,979 A | 8/1981 | Rakocy | |
| 4,364,525 A | 12/1982 | McClean | |
| 4,369,680 A | 1/1983 | Williams | |
| 4,570,519 A | 2/1986 | Motosko | |
| 4,624,166 A | 11/1986 | Kreth | |
| 4,688,478 A | 8/1987 | Williams | |
| 4,733,589 A | 3/1988 | Wolff | |
| 4,998,677 A | 3/1991 | Gallaher | |
| 5,197,681 A | 3/1993 | Libermann | |
| 5,577,430 A | 11/1996 | Gunderson | |
| 7,681,817 B2 | 3/2010 | Orent | |
| 7,694,615 B2 | 4/2010 | Dipietro | |
| 8,671,832 B2 * | 3/2014 | Beber et al. | 99/462 |
| 2006/0075872 A1 | 4/2006 | Wangler | |
| 2006/0150791 A1 | 7/2006 | Chase | |
| 2007/0044621 A1 | 3/2007 | Rote | |
| 2007/0095959 A1 | 5/2007 | Narai et al. | |
| 2007/0261523 A1 | 11/2007 | Hussey | |
| 2008/0156913 A1 | 7/2008 | Orent | |
| 2008/0163768 A1 | 7/2008 | Glucksman | |

(Continued)

FOREIGN PATENT DOCUMENTS

| | | |
|---|---|---|
| EP | 0244016 A1 | 11/1987 |
| EP | 2130471 A1 | 12/2009 |

(Continued)

OTHER PUBLICATIONS

"Home Cooking in Montana", Product Review . . . Cuisinart Elite 12 Cup Food Processor Model FP-12DC; http://homecookinginmontana.blogspot.com/2010/03/product-reviewcuisinart-elite-12-cup.html.

(Continued)

*Primary Examiner* — Mark Rosenbaum

(57) ABSTRACT

A food processor includes a base and a bowl with a removable lid. Food items are advanced into the bowl through a feed tube formed in the lid where they are cut by a cutting assembly driven by a motor. The cutting assembly is adjustable to vary the thickness of the cut food items. The food processor includes an adjustment assembly that is operable to adjust the cutting thickness of the cutting assembly while the cutting assembly is driven by the motor.

16 Claims, 11 Drawing Sheets

(56) References Cited

U.S. PATENT DOCUMENTS

| | | |
|---|---|---|
| 2009/0301319 A1 | 12/2009 | Bigge |
| 2009/0314168 A1 | 12/2009 | Krasznal |
| 2011/0139017 A1 | 6/2011 | Beber et al. |

FOREIGN PATENT DOCUMENTS

| | | |
|---|---|---|
| FR | 2582497 A1 | 12/1986 |
| FR | 2602660 A1 | 2/1988 |
| JP | 01299522 | 4/1989 |
| JP | 01153123 | 6/1989 |
| JP | 04099551 | 3/1992 |
| JP | 04099552 | 3/1992 |
| WO | 0159153 A3 | 8/2001 |
| WO | 2009076585 A1 | 6/2009 |

OTHER PUBLICATIONS

European Patent Application No. 12192818.8 filed Nov. 15, 2012, Applicant: Whirlpool Corporation, European Extended Search Report, re: Same, Mail Date: Oct. 9, 2013.

European Patent Application No. 12192827.9 filed Nov. 15, 2012, Applicant: Whirlpool Corporation, European Search report re: same with a mail date Jul. 17, 2013.

European Patent Application No. 12192821.2 filed Nov. 15, 2012, Applicant: Whirlpool Corporation, European Extended Search Report, re: Same, Mail Date: Oct. 8, 2013.

\* cited by examiner

FOOD PROCESSING DEVICE WITH LID MOUNTED ADJUSTMENT MECHANISM

CROSS-REFERENCE TO RELATED U.S. PATENT APPLICATIONS

Cross-reference is made to co-pending U.S. Utility patent application Ser. No. 13/307,496, entitled "EXTERNALLY-OPERATED ADJUSTMENT MECHANISM FOR A FOOD PROCESSING DEVICE," which is being filed concurrently herewith (PAT-00057-US-NP), and U.S. Utility patent application Ser. No. 13/307,385, entitled "USER-CONTROLLED ADJUSTMENT MECHANISM FOR A FOOD PROCESSING DEVICE" which is being filed concurrently herewith (PAT-00056-US-NP), each of which is assigned to the same assignee as the present application and each of which is hereby incorporated by reference.

TECHNICAL FIELD

The present disclosure relates generally to a domestic food processing device, and, more particularly, to a food processing device having a control for adjusting the cutting thickness of the food processing device.

BACKGROUND

A food processing device is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool and collected in the bottom of the bowl. Some food processors also include an outlet on the bowl that guides the processed food items into an outside bin, container, or other bowl.

Food processors typically come equipped with a number of interchangeable cutting tools for slicing, shredding, or other food processing operations. One common cutting tool is a rotating disk-type cutter. Such a cutting tool includes a rotating disk and a cutting blade that are driven by the motor. The cutting blade is secured to the rotating disk at a location adjacent to an aperture formed in the disk so that processed food items cut by the blade fall through the aperture.

SUMMARY

According to one aspect of the disclosure, a food processor includes a base having a motor positioned therein, a bowl removably coupled to the base that has a processing chamber defined therein, and a lid removably coupled to the bowl. The lid has a feed tube that opens into the processing chamber. The food processor also includes a cutting assembly positioned in the processing chamber that is driven by the motor to cut food items advanced through the feed tube. The cutting assembly includes a cutting blade and a rotating disk that is upwardly and downwardly moveable relative to the cutting blade between a plurality of cutting positions to produce cut food items of varying thicknesses. The food processor also includes an adjustment assembly secured to the lid. The adjustment assembly includes an actuator configured to move upwardly and downwardly relative to the lid, and the actuator has a first end positioned above an outer surface of the lid and a second end configured to be rotatively coupled to the rotating disk such that movement of the actuator relative to the lid causes the rotating disk to move between the plurality of cutting positions while the cutting assembly is driven by the motor.

In some embodiments, the actuator may have a body that extends through the lid and a bearing that is positioned between the body and the rotating disk. The bearing may be configured to permit the rotating disk to rotate relative to the body of the actuator.

In some embodiments, the food processor may further include a sleeve secured to the lid, and the sleeve may have an internally-threaded body. The body of the actuator may be externally-threaded and may be received in the internally-threaded body of the sleeve. When the actuator is rotatively coupled to the rotating disk, rotation of the body in a first direction may cause the rotating disk to advance downward relative to the cutting blade and rotation of the body in a second direction may cause the rotating disk to move upward relative to the cutting blade.

Additionally, in some embodiments, the cutting assembly may further include a spring positioned between the cutting blade and the rotating disk. The spring may bias the rotating disk in a first cutting position to produce a food item having a first thickness. When the actuator is rotatively coupled to the rotating disk, rotation of the body in the first direction may cause the rotating disk to move downward relative to the cutting blade from the first cutting position to a second cutting position to produce a food item having a second thickness greater than the first thickness.

In some embodiments, the adjustment assembly may further include a control knob secured to the first end of the actuator. The control knob may have a grip positioned above the outer surface of the lid.

In some embodiments, the adjustment assembly may include a user-operated control device moveably coupled to the lid. The user-operated control device may include a pin that is moveable between a first position in which the actuator is prevented from moving upwardly and downwardly relative to the lid, and a second position in which the actuator is permitted to move upwardly and downwardly relative to the lid. Additionally, in some embodiments, the body of the actuator may have a plurality of notches defined therein. A tip of the pin may be received in one of the plurality of notches when the pin is in the first position. In some embodiments, the adjustment assembly may further include a spring that biases the pin in the first position.

In some embodiments, the user-operated control device may include a control button secured to the pin. The control button may be configured to slide along the outer surface of the lid. Additionally, in some embodiments, the adjustment assembly may further include a user-operated button secured to the first end of the actuator. The pin may be configured to move to the second position when a predetermined amount of force is applied to the user-operated button.

In some embodiments, the rotating disk may include a planar body and a sleeve extending downwardly from a lower surface of the planar body. The cutting blade may be coupled to a central shaft positioned in the sleeve of the rotating disk.

In some embodiments, the food processor may include a drive stem connecting the cutting assembly to the motor. The drive stem may have a keyed end that is received in a corresponding socket defined in the central shaft.

According to another aspect, a food processor includes a base having a motor positioned therein, a bowl removably coupled to the base that has a processing chamber defined therein, and a lid removably coupled to the bowl. The lid has a feed tube that opens into the processing chamber. The food processor also includes a cutting assembly positioned in the processing chamber that is driven by the motor to cut food items advanced through the feed tube. The cutting assembly includes a cutting blade and a rotating disk that is upwardly and downwardly moveable relative to the cutting blade between a plurality of cutting positions to produce cut food items of varying thicknesses.

The food processor also includes an adjustment assembly moveably coupled to the lid. The adjustment assembly includes an actuator that is configured to move upwardly and downwardly relative to the lid and is configured to be rotatively coupled to the rotating disk. A user-operated control device is positioned above an outer surface of the lid. The user-operated control device is operable to move the actuator relative to the lid such that the rotating disk is moved between the plurality of cutting positions when the actuator is rotatively coupled to the rotating disk and the cutting assembly is driven by the motor.

In some embodiments, the actuator may have a body and a bearing positioned between the body and the rotating disk. The bearing may be configured to permit the rotating disk to rotate relative to the body. The adjustment assembly may further a sliding beam coupled to the user-operated control device. The sliding beam may be configured to move along an inner surface of the lid. The sliding beam may have an inclined surface in contact with the body of the actuator such that movement of the sliding beam relative to the inner surface of the lid causes the actuator to move upwardly and downwardly relative to the lid.

In some embodiments, the user-operated control device may include a control button positioned above the outer surface of the lid and an arm extending through a slot defined in the lid. The arm may connect the control button to the sliding beam.

In some embodiments, the rotating disk may include a hub and a planar body extending outwardly from the hub. The cutting blade may be coupled to a central shaft positioned in the hub, and the cutting assembly may include a spring positioned between a flange of the central shaft and the sleeve of the rotating disk. The spring may bias the rotating disk in a first cutting position to produce a food item having a first thickness.

In some embodiments, when the actuator is rotatively coupled to the rotating disk, downward movement of the actuator may cause the rotating disk to move downward relative to the cutting blade from the first cutting position to a second cutting position to produce a second food item having a second thickness greater than the first thickness.

Additionally, in some embodiments, the user-operated control device may include a control knob secured to a first end of the actuator above the outer surface of the lid. In some embodiments, the user-operated control device may include a pin that is moveable between a first position in which the actuator is prevented from moving upwardly and downwardly relative to the lid, and a second position in which the actuator is permitted to move upwardly and downwardly relative to the lid.

According to another aspect, the food processor includes a base having a motor positioned therein, a bowl removably coupled to the base that has a processing chamber defined therein, and a lid removably coupled to the bowl. The lid has a feed tube that opens into the processing chamber. The food processor also includes a cutting assembly positioned in the processing chamber and driven by the motor to cut food items advanced through the feed tube. The cutting assembly includes a cutting blade and a rotating disk that is upwardly and downwardly moveable relative to the cutting blade between a plurality of cutting positions to produce cut food items of varying thicknesses.

The food processor also includes an adjustment assembly having a user-operated control device positioned above an outer surface of the lid and an actuation device configured to move the rotating disk between the plurality of cutting positions. The user-operated control device is operable to control the actuation device to move the rotating disk between the plurality of cutting positions while the cutting assembly is driven by the motor.

According to another aspect of the disclosure, a food processor is disclosed. The food processor includes a base having a motor positioned therein, a bowl removably coupled to the base that has a processing chamber defined therein, and a lid removably coupled to the bowl. The lid has a feed tube that opens into the processing chamber when the lid is secured to the bowl. The food processor also includes a cutting assembly positioned in the processing chamber and driven by the motor to cut food items advanced through the feed tube. The cutting assembly includes a cutting blade and a rotating disk that is upwardly and downwardly moveable relative to the cutting blade between a plurality of cutting positions to produce cut food items of varying thicknesses. The food processor has an adjustment assembly that includes a handle and an actuator operable to move the rotating disk between the plurality of cutting positions while the cutting assembly is driven by the motor. The handle is moveably coupled to the bowl and is configured to rotate about a longitudinal axis of the bowl. Rotation of the handle about the longitudinal axis operates the actuator to move the rotating disk.

In some embodiments, the actuator may be movably coupled to the lid, and the actuator may be configured to move upwardly and downwardly relative to the lid when the handle is rotated about the longitudinal axis. In some embodiments, the lid may have a sleeve secured thereto, and the sleeve may have an internally-threaded body. The actuator may include an end configured to be rotatively coupled to the rotating disk and an externally-threaded body that is received in the internally-threaded body of the sleeve. When the actuator is rotatively coupled to the rotating disk, rotation of the body in a first direction may cause the rotating disk to advance downward relative to the cutting blade, and rotation of the body in a second direction may move the rotating disk upward relative to the cutting blade.

Additionally, in some embodiments, the adjustment assembly may further include a lever having a first lever end coupled to the actuator and a second lever end removably coupled to the handle. In some embodiments, the cutting assembly may further include a spring positioned between the cutting blade and the rotating disk. The spring may bias the rotating disk in a first cutting position to produce a food item having a first thickness, and rotation of the body of the actuator in the first direction when the actuator is rotatively coupled to the rotating disk may cause the rotating disk to move relative to the cutting blade from the first cutting position to a second cutting position to produce a food item having a second thickness greater than the first thickness.

In some embodiments, the actuator may include a body that extends through the lid, and a bearing that is positioned between the body and the rotating disk. The bearing may be configured to permit the rotating disk to rotate relative to the body of the actuator.

In some embodiments, the food processor may further include a locking mechanism configured to inhibit rotation of the handle about the longitudinal axis. Additionally, in some embodiments, the locking mechanism may include a first plurality of ribs defined on an outer surface of the bowl, and a second plurality of ribs defined on the handle. The second plurality of ribs may be engaged with the first plurality of ribs.

According to another aspect, a food processor includes a base having a motor positioned therein, a bowl removably coupled to the base that has a processing chamber defined therein, and a lid that includes a shell removably coupled to the bowl. The food processor also includes a cutting assembly positioned in the processing chamber and driven by the motor to cut food items advanced through the feed tube. The cutting assembly is positionable between a plurality of cutting positions to produce cut food items of varying thicknesses. The food processor also has an adjustment assembly including a feed tube moveably coupled to the shell, and an actuator operable to move the cutting assembly between the plurality of cutting positions while the cutting assembly is driven by the motor. Movement of the feed tube relative to the shell operates the actuator to move the cutting assembly.

In some embodiments, the shell may include an opening defined in an upper surface and an inner wall that extends downwardly from the opening to define a passageway through the shell. The actuator may be positioned in the passageway and may be configured to move upwardly and downwardly along the passageway. The actuator may have a first end configured to be rotatively coupled to the cutting assembly. Movement of the actuator along the passageway may cause the cutting assembly to move between the plurality of cutting positions when the actuator is rotatively coupled to the cutting assembly.

Additionally, in some embodiments, the cutting assembly may include a cutting blade and a rotating disk. The rotating disk may be upwardly and downwardly moveable relative to the cutting blade to produce food items of varying thicknesses. In some embodiments, the cutting assembly may further include a spring positioned between the cutting blade and the rotating disk. The spring may bias the rotating disk in a first cutting position to produce a food item having a first thickness. When the actuator is rotatively coupled to the cutting assembly, movement of the actuator along the passageway of the lid in a first direction may cause the rotating disk to move relative to the cutting blade from the first cutting position to a second cutting position to produce a food item having a second thickness different from the first thickness.

In some embodiments, the inner wall of the shell may have a first plurality of threads formed thereon, and the actuator may include a body that has a second plurality of threads that engage the first plurality of threads. The actuator may be configured to be rotatively coupled to the rotating disk such that rotation of the body in a first direction may cause the rotating disk to advance downward relative to the cutting blade and rotation of the body in a second direction may cause the rotating disk to move upward relative to the cutting blade.

In some embodiments, the feed tube may be configured to rotate about a longitudinal axis defined by the shell. Additionally, in some embodiments, the shell may have a curved slot defined in the upper surface, and the feed tube may be configured to slide along the curved slot to rotate about the longitudinal axis.

In some embodiments, the adjustment assembly may further include a lever having a first lever end coupled to the actuator and a second lever end coupled to the feed tube. Movement of the feed tube may cause rotation of the actuator. In some embodiments, the feed tube may include a body rotatively coupled to the shell. The feed tube may be configured to rotate about a longitudinal axis defined by the body.

In some embodiments, the adjustment assembly may further include a gear assembly coupled to the lid, and the gear assembly may be operable to move the actuator upwardly and downwardly along the passageway. Additionally, in some embodiments, the gear assembly may include a gear having a first plurality of teeth formed thereon, and the body of the feed tube may include a second plurality of teeth that are interdigitated with the first plurality of teeth of the gear.

According to another aspect, a food processor includes a base having a motor positioned therein, a bowl removably coupled to the base that has a processing chamber defined therein, and a lid removably coupled to the bowl. The lid has a feed tube that opens into the processing chamber when the lid is secured to the bowl. The food processor also includes a cutting assembly positioned in the processing chamber and driven by the motor to cut food items advanced through the feed tube. The cutting assembly includes a cutting blade, a rotating disk configured to move relative to the cutting blade, and a spring positioned between the cutting blade and the rotating disk. The spring biases the rotating disk in a first cutting position to produce a food item having a first thickness. The food processor further includes an adjustment assembly coupled to the rotating disk. The adjustment assembly is operable to move the rotating disk relative to the cutting blade from the first cutting position to a second cutting position to produce a food item having a second thickness greater than the first thickness while the cutting assembly is driven by the motor.

BRIEF DESCRIPTION OF THE DRAWINGS

The detailed description particularly refers to the following figures, in which.

DETAILED DESCRIPTION OF THE DRAWINGS

Figure 1:
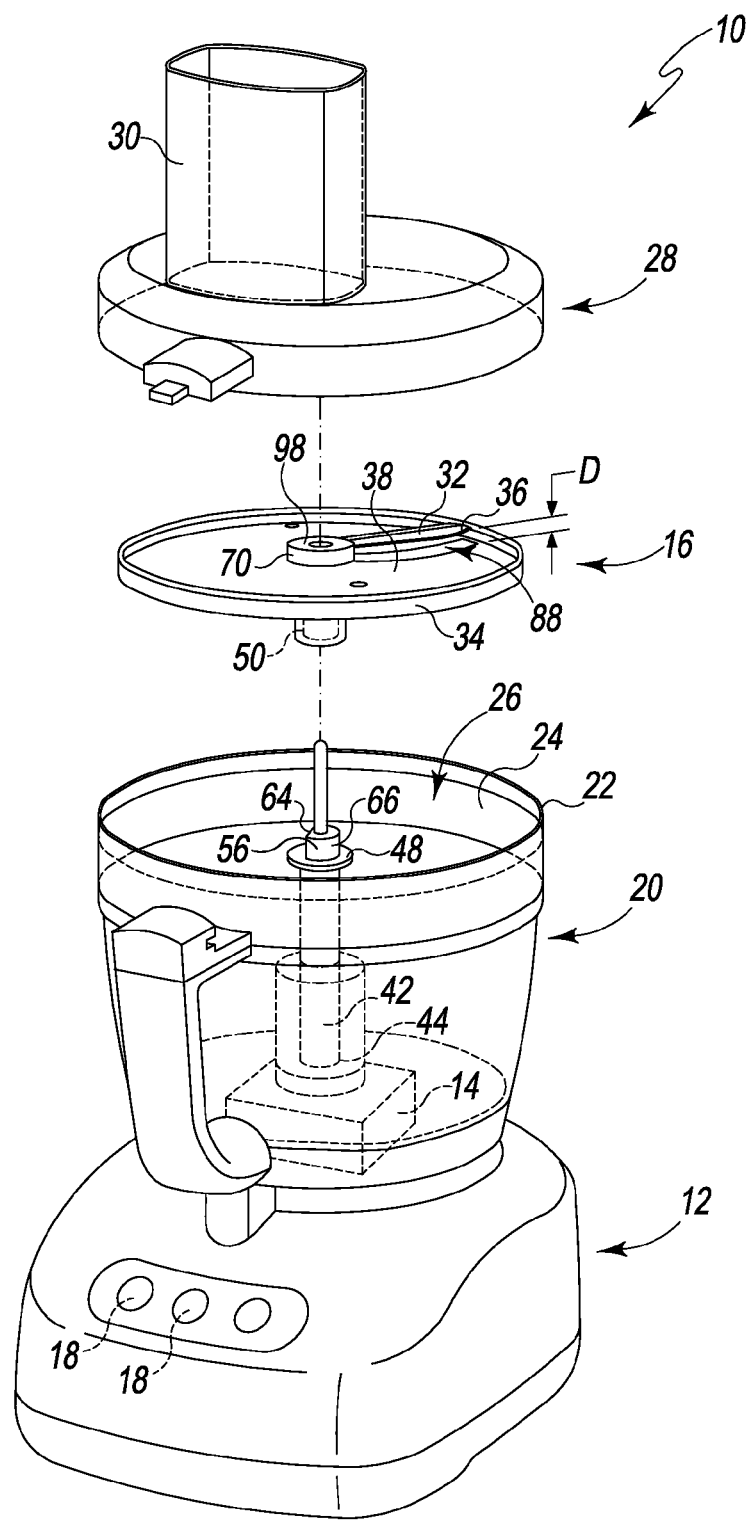
FIG. 1 is an exploded, perspective view of one embodiment of a food processor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a food processing device or food processor 10 is shown. The food processor 10 has a base 12 that houses a motor 14 and a control unit. Under the control of the control unit, the motor 14 drives a cutting assembly 16 to cut food items such as cheeses, meats, fruits, and vegetables. The base 12 also includes one or more buttons, switches, dials, or other types of controls 18. A user operates the controls 18 to control the operation of the motor 14 and hence the food processor 10. For example, one of the controls 18 may be operable to turn the motor 14 on and off while another control 18 may change the motor's speed.

As will be understood by those skilled in the art, the control unit may comprise analog and/or digital circuitry to process electrical signals received from the motor 14 (or other components of the food processor 10) and provide electrical control signals to the motor or other components of the food processor 10. For example, the control unit may be embodied as a microcontroller that executes firmware routines to control the operation of the food processor 10.

A removable receptacle or bowl 20 is secured to the base 12. The bowl's handle facilitates placement of the bowl 20 on the base 12. The bowl 20 has an upper rim 22 and an inner wall 24 that extends downwardly from the upper rim 22 to define a processing chamber 26 where food items may be processed by the cutting assembly 16. The food processor 10 also includes a removable lid 28 that is configured to be secured to the rim 22 of the bowl 20. In that way, the removable lid 28 encloses the processing chamber 26. The lid 28 has a feed tube 30 formed thereon through which food items such as fruits and vegetables may be inserted into the bowl 20 to be processed by the food processor 10. It should be appreciated that in other embodiments the food processor 10 may include other embodiments of the bowl, the lid, or any other component, as described in greater detail below.

The bowl 20, lid 28, and feed tube 30 are generally made of a transparent or translucent plastic material so that the contents of the food processor 10 can be viewed by a user without removing the lid 28 from the bowl 20. Moreover, one or more locking mechanisms may be used to lock the bowl to the base 12 and the lid 28 to the bowl 20.

As shown in FIG. 1, the cutting assembly 16 includes a cutting blade 32 and a rotating disk 34. A vertical distance, D, between the cutting edge 36 of the cutting blade 32 and the upper surface 38 of the rotating disk 34 defines a cutting thickness of food items processed by the cutting assembly 16. In other words, the thickness of the processed food items cut by the food processor 10 is determined by the distance D between the cutting edge 36 of the cutting blade 32 and the upper surface 38 of the rotating disk 34. As the distance D between the cutting edge 36 of the cutting blade 32 and the upper surface 38 of the rotating disk 34 increases, thicker pieces of food items may be created; thinner pieces of food items may be created when the distance D between the cutting edge 36 of the cutting blade 32 and the upper surface 38 of the rotating disk 34 decreases. The position of the rotating disk 34 relative to the cutting blade 32 may be controlled by a thickness adjustment assembly, as described in greater detail below.

Figure 2:
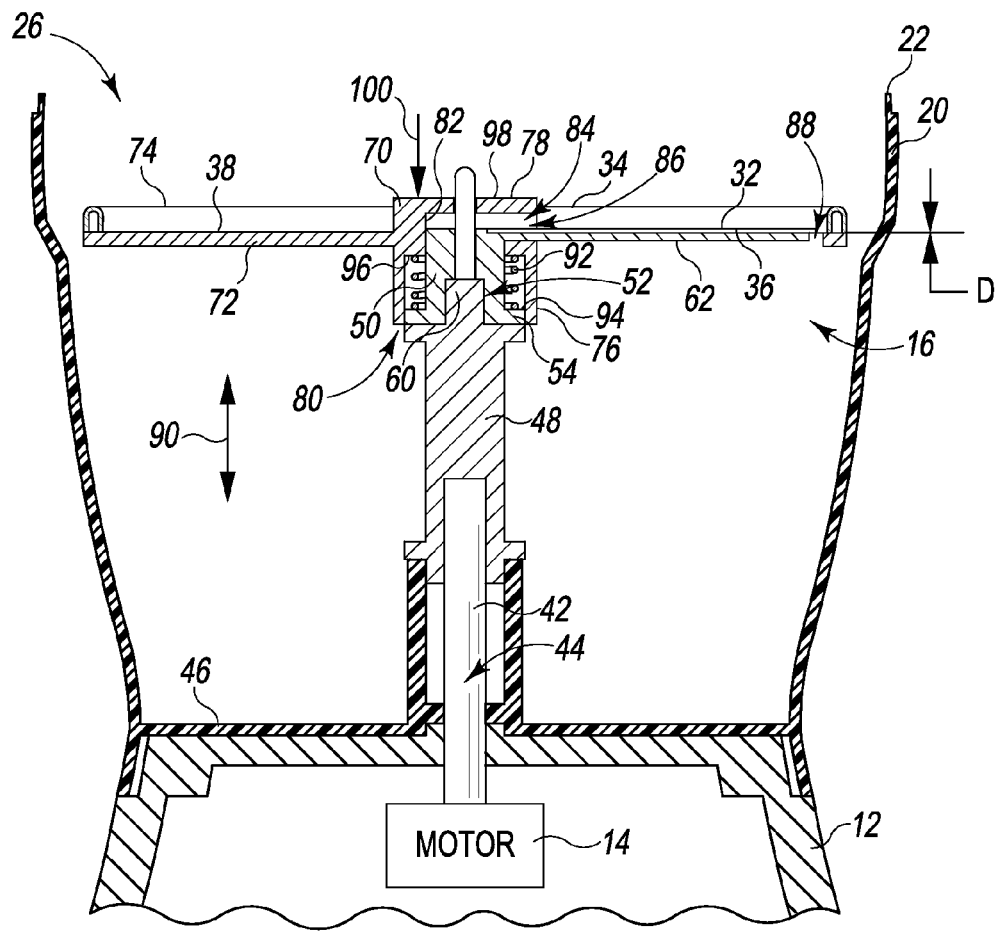
FIG. 2 is a partial cross-sectional side elevation view of the food processor of FIG. 1 showing a cutting assembly.

The motor 14 includes an output shaft 42 extending upwardly from the base 12 through an opening 44 defined in the bottom wall 46 of the bowl 20. The output shaft 42 is coupled to a removable drive stem 48 within the processing chamber 26. The removable drive stem 48 is configured to be coupled to a central shaft 50 of the cutting assembly 16 such that the cutting assembly 16 may be driven by the motor 14. As shown in FIGS. 1 and 2, the central shaft 50 has a plurality of inner walls that define a socket 52 in a lower end 54 thereof, and the drive stem 48 has an upper end 56 that is keyed to substantially match the configuration of the socket 52. In the illustrative embodiment, the upper end 56 is "D-shaped," including a flat surface 64 and a curved surface 66, and the socket 52 has a corresponding geometric shape that is sized to receive the upper end 56 of the drive stem 48. When the drive stem 48 is secured to the cutting assembly 16 as shown in FIG. 2, the keyed upper end 56 of the stem 48 is received in the socket 52 of the central shaft 50. As such, rotation of the output shaft 42 of the motor 14 causes rotation of the cutting assembly 16.

It should be appreciated that in other embodiments the arrangement of the socket and keyed end may be reversed, with the keyed end being formed on the central shaft 50 and the socket being defined in the drive stem 48. It should also be appreciated that in other embodiments other methods of attachment may be used to secure the drive stem to the cutting assembly. For example, a pair of tabs may extend from the upper end of the drive stem 48, and those tabs may be received in a corresponding socket defined in the central shaft 50.

Referring now to FIG. 2, the cutting assembly 16 also includes a mounting arm 62 that extends outwardly from the central shaft 50, and the cutting blade 32 is secured to the upper surface of the mounting arm 62. In the exemplary embodiment, the central shaft 50 and the mounting arm 62 are formed from a metallic material as a single monolithic component. It should be appreciated that in other embodiments the shaft 50 and the arm 62 may be formed as separate components, which are then joined together during final assembly by an adhesive or other suitable fastener. A number of fasteners (not shown) rigidly secure the cutting blade 32 to the mounting arm 62. It will be appreciated that the fasteners may take the form of screws, T-stakes, pins, posts, or other structures capable of securing the cutting blade 32 to the arm 62.

The rotating disk 34 includes a central hub 70, a planar body 72 extending radially outward from the central hub 70, and a rim 74 extending upwardly from the outer perimeter of the planar body 72. The rotating disk 34 has a diameter that is slightly less than the inner diameter of the bowl 20 such that the rim 74 is positioned adjacent to, but is slightly spaced apart from, the inner wall of the bowl to permit rotation of the disk 34 within the bowl 20. In the exemplary embodiment described herein, the planar body 72 and the rim 74 are embodied as a monolithic structure (e.g., a single molded or cast part). However, it should be appreciated that all of the components of the rotating disk 34 (e.g., hub 70, body 72, and rim 74) may be integrated into a single monolithic structure or may be formed as separate components secured to one another by an adhesive or other suitable fastener. It should also be appreciated that in other embodiments the one or more structures of the rotating disk may be modified or omitted. For example, in some embodiments, the rim may be omitted or reduced in height.

As shown in FIG. 2, the hub 70 of the rotating disk 34 has a lower end 76 positioned below the planar body 72 and an upper end 78 positioned above the planar body 72. An opening 80 is defined in the lower end 76 of the hub 70, and an inner wall 82 extends inwardly from the opening 80 to define an aperture 84 in the hub 70. A pocket 86 is defined in the hub 70 between the lower end 76 and the upper end 78, and the pocket 86 opens into the aperture 84.

The rotating disk 34 and the cutting blade 32 are coupled together via the central shaft 50, which is positioned in the aperture 84 of the hub 70, and the mounting arm 62, which extends outwardly through the pocket 86 of the hub 70 and is positioned in an oblong opening 88 formed in the rotating disk 34. The central shaft 50, the mounting arm 62, and the hub 70 are keyed such that the cutting blade 32 is torsionally secured to the rotating disk 34. In that way, the blade 32 and disk 34 may be driven together by the motor 14.

As described above, the rotating disk 34 of the cutting assembly 16 is configured to slide vertically relative to the blade 32 to adjust the cutting thickness of the cutting assembly 16, as indicated by arrow 90 in FIG. 2. The cutting assembly 16 has a biasing element that is configured to maintain the rotating disk 34 in a predetermined cutting position relative to the blade 32. The biasing element, such as, for example, spring 92, is positioned between a flange 94 that extends outwardly from the lower end 54 of the central shaft 50 and a rim 96 defined by the inner wall 82 of the hub 70 of the rotating disk 34. In the illustrative embodiment, the spring 92 biases the rotating disk 34 in a thin cutting position relative to the cutting blade 32 in which the cutting thickness is less than one millimeter. It should be appreciated that in other embodiments the biasing element may be arranged in the cutting assembly such that the rotating disk 34 is biased in another cutting position in which the cutting thickness is greater than five millimeters.

Because the spring 92 maintains the rotating disk 34 in a cutting position in which the distance D defined between the cutting edge 36 of the cutting blade 32 and the upper surface 40 of the rotating disk 34 is relatively minimal, thinner food slices may be produced. In use, when a predetermined amount of force is applied to the upper surface 98 of the hub 70 in the direction indicated by arrow 100, the rotating disk 34 is moved downward relative to the cutting blade 32. Because the cutting blade 32 is fixed to the drive stem 48, the cutting blade 32 is maintained in its vertical position such that, as the rotating disk 34 moves downwardly, the distance D defined between the cutting edge 36 of the cutting blade 32 and the upper surface 40 of the rotating disk 34 is increased, thereby increasing the cutting thickness such that thicker food slices may be produced. When the predetermined amount of force is released from the upper surface 98 of the hub 70, the spring 92 urges the rotating disk 34 to move upward relative to the cutting blade 32 to the position shown in FIG. 2.

It should be appreciated that the cutting blade may be vertically fixed relative to the rotating disk via a spring, snap feature, or twist lock connecting the central shaft to the drive stem. The position of the central shaft may also be fixed between, for example, the drive stem and a bearing surface formed on the lid.

Figure 3:
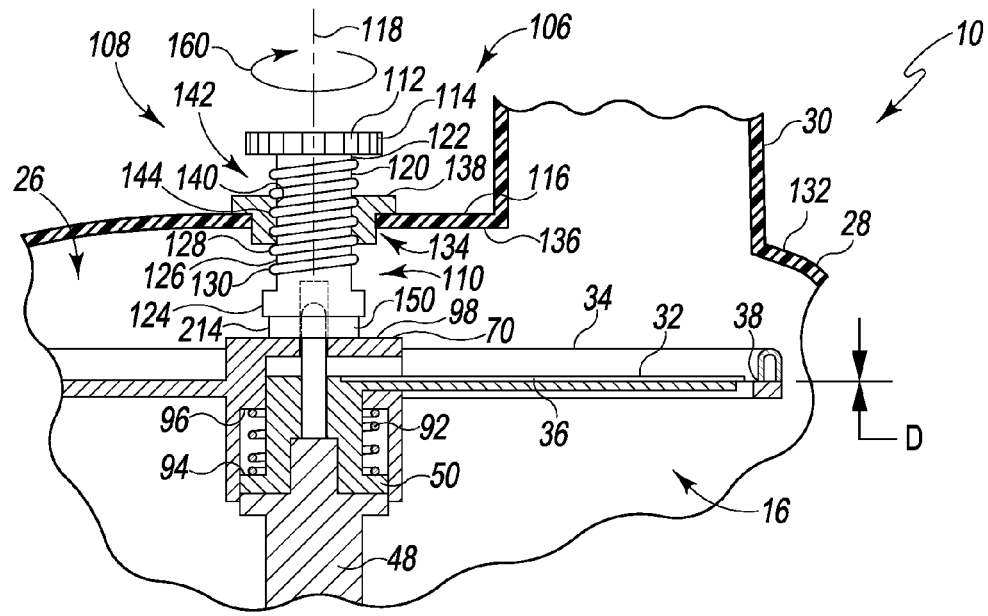
FIG. 3 is another partial cross-sectional side elevation view showing one embodiment of an adjustment assembly for the food processor of FIG. 1 with the cutting assembly in one position.
Figure 4:
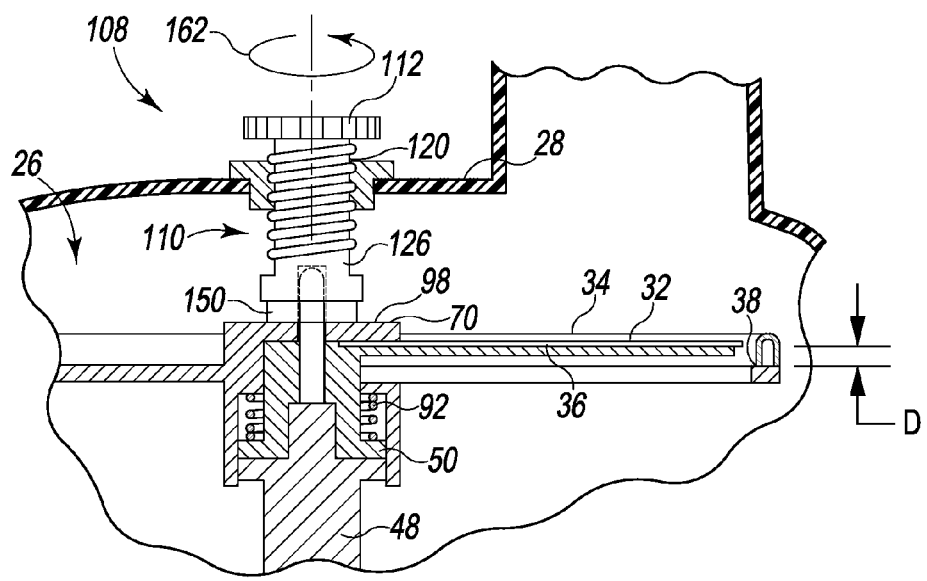
FIG. 4 is a view similar to FIG. 3 showing the cutting assembly in another position.

Referring now FIGS. 3 and 4, a thickness adjustment assembly 106 of the food processor 10 is shown. The adjustment assembly 106 is integrated into the lid 28 and is operable to vary the cutting thickness of the food processor 10 while the cutting assembly 16 is driven by the motor 14, thereby creating thicker or thinner pieces of food items during a cutting operation. It should be appreciated that the adjustment assembly may be embodied as a single, monolithic component or multiple components that are later assembled. In the illustrative embodiment, the adjustment assembly 106 includes a user-operated control device 108 that is located outside of the processing chamber 26 and an actuation device 110 that is configured to move the rotating disk 34 relative to the cutting blade 32 when operated by the control device 108. What is meant herein by the term "outside" as it relates to the location of the user-operated control device relative to the bowl or the processing chamber is that the structure of the control device contacted by the user to operate the device is positioned external to the bowl and lid so that it may be operated by the user while the lid is secured to the bowl, thereby allowing the cutting thickness of the food processor to be adjusted while the cutting assembly 16 is driven by the motor 14.

For example, in the embodiment of FIGS. 3 and 4, the external control device 108 is embodied as a control knob 112 positioned above the outer surface 116 of the lid 28. The control knob 112 is configured to rotate about an axis 118 to change the cutting thickness of the cutting assembly 16 without removing the lid 28 from the bowl 20. In such a configuration, the user turns the knob 112 in one direction or the other to change (i.e., increase or decrease) the distance D between the cutting edge 36 of the cutting blade 32 and the upper surface 40 of the rotating disk 34. The control knob 112 has a knurled grip 114 formed thereon to assist the user in turning the knob 112.

The actuation device 110 of the adjustment assembly 106 includes an actuator 120 that is secured to the control knob 112 at an upper end 122. The actuator 120 extends downwardly from the control knob 112 through the lid 28 to a lower end 124 positioned in the processing chamber 26. The actuator 120 is illustratively embodied as a rod that includes a cylindrical shaft 126. The shaft 126 is externally-threaded, with a plurality of external threads 128 that are defined in an outer surface 130 thereof.

As shown in FIG. 3, the lid 28 includes a shell 132 and the feed tube 30 extends upwardly from the outer surface 116 of the shell 132. The shell 132 has an opening 134 defined therein that extends between the outer surface 116 and an inner surface 136 thereof. A hollow sleeve 138 is positioned in the opening 134 and secured to the lid 28. The hollow sleeve 138 has an inner wall 140 that defines a passageway 142 extending therethrough. The inner wall 140 is internally-threaded, with a plurality of internal threads 144 defined in a cylindrical surface thereof. It should be appreciated that the sleeve and the shell may be formed as a single, monolithic component or formed separately for later assembly.

The internal threads 144 correspond to the external threads 128 formed on the cylindrical shaft 126 of the actuator 120. As shown in FIG. 3, the internal threads 144 of the lid 28 threadingly engage the external threads 128 of the actuator 120. Because the control knob 112 is secured to the actuator 120, operation of the control knob 112 causes the actuator 120 to move upwardly and downwardly relative to the lid 28. For example, clockwise rotation of the control knob 112 may cause downward movement of the actuator 120, while counter-clockwise rotation of the control knob 112 may cause upward movement of the actuator 120.

As shown in FIGS. 3 and 4, rotation of the control knob 112 advances the lower end 124 of the actuator 120 into contact with the upper surface 98 of the hub 70 of the rotating disk 34 when the lid 28 is secured to the bowl 20. The lower end 124 of the actuator 120 is configured to be rotatively coupled to the rotating disk 34 such that the actuator 120 does not rotate with the cutting assembly 16 as the cutting assembly 16 is driven by the motor 14. In the illustrative embodiment, the actuator 120 of the adjustment assembly 106 has a bearing 150 attached to the cylindrical shaft 126 at the lower end 124 of the actuator 120. The bearing 150 is illustratively embodied as a thrust bearing that permits relative axial motion between the actuator 120 and the rotating disk 34 while being loaded axially between the shaft 126 and the rotating disk 34. It should be appreciated that in other embodiments the actuator may be configured to be rotatively coupled to the rotating disk 34 in other ways, such as, for example, via a roller cam, a slip joint, or other means. It should also be appreciated that in other embodiments the bearing may be secured to the rotating disk rather than the shaft.

In use, the lid 28 is secured to the bowl 20 as shown in FIGS. 3 and 4, and a user operates the controls 18 to energize the motor 14 to rotate the output shaft 42 and the drive stem 48. Because the cutting assembly 16 is secured to the drive stem 48 via the central shaft 50, rotation of the output shaft 42 causes rotation of the cutting assembly 16. While the motor 14 is energized, the user may advance food items into the processing chamber 26 through the feed tube 30 to be cut by the spinning cutting assembly 16.

If the user desires to increase the cutting thickness during the cutting operation, the user may grasp the grip 114 of the control knob 112 and rotate the control knob 112 in the direction indicated by arrow 160 in FIG. 3. As the control knob 112 is rotated, the actuator 120 is advanced downward relative to the lid 28. The lower end 124 of the actuator 120 engages the upper surface 98 of the hub 70 to move the rotating disk 34 downward relative to the cutting blade 32. As a result, the distance D defined between the cutting edge 36 and the upper surface 40 of the rotating disk 34 increases and thereby increases the thickness of food items being processed by the food processor 10. The bearing 150 isolates the actuator 120 from the rotation of the cutting assembly 16 and isolates the cutting assembly 16 from the rotation of the actuator 120 such that only the vertical motion of the actuator 120 is transferred to the rotating disk 34. In that way, the user may adjust the cutting thickness while the cutting assembly 16 is driven by the motor 14 without interfering with the cutting operation.

If the user desires to decrease the cutting thickness during the cutting operation, the user may grasp the grip 114 of the control knob 112 and rotate the control knob 112 in the direction indicated by arrow 162 in FIG. 4. As the control knob 112 is rotated, the actuator 120 is advanced upward relative to the lid 28, and the spring 92 urges the rotating disk 34 to move upward relative to the cutting blade 32. As a result, the distance D defined between the cutting edge 36 and the upper surface 40 of the rotating disk 34 decreases, thereby decreasing the thickness of food items being processed by the food processor 10.

Referring now to FIGS. 5-8, additional lids for the food processor 10 are shown. Each lid includes another embodiment of a thickness adjustment assembly. Some features of the embodiments illustrated in FIGS. 5-8 are substantially similar to those discussed above in reference to the embodiment of FIGS. 1-4. Such features are designated in FIGS. 5-8 with the same reference numbers as those used in FIGS. 1-4.

Figure 5:
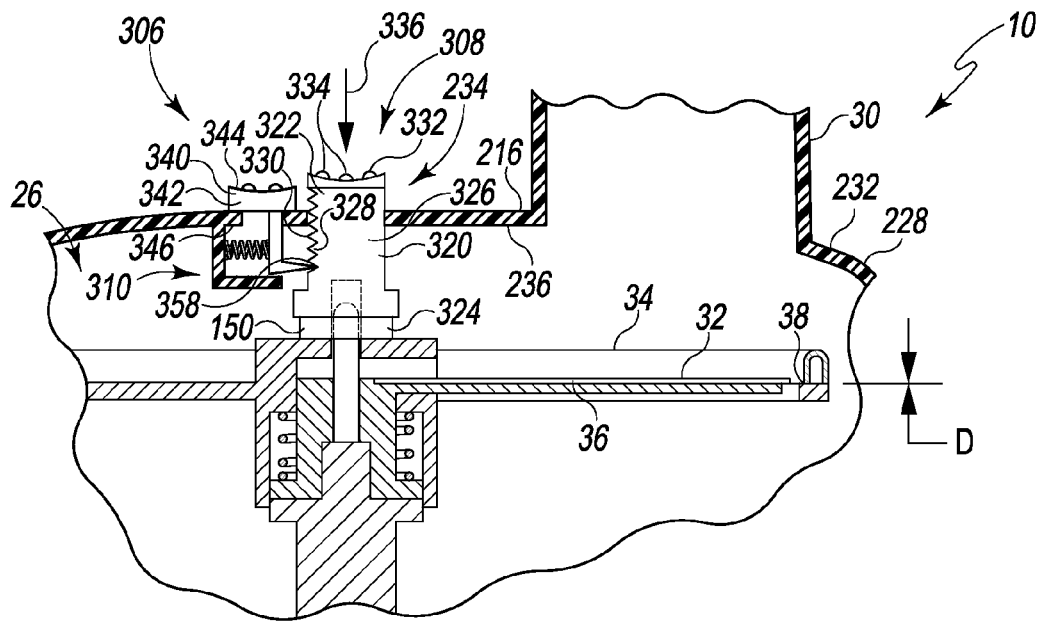
FIG. 5 is a partial cross-sectional side elevation view showing another embodiment of an adjustment assembly for the food processor of FIG. 1 with the cutting assembly in one position.
Figure 6:
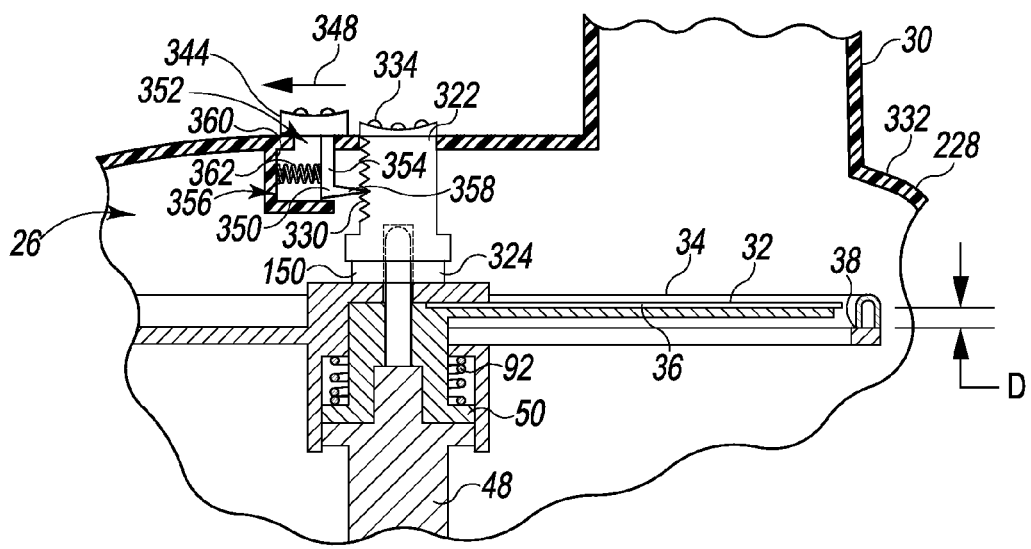
FIG. 6 is a view similar to FIG. 5 showing the cutting assembly in another position.

Referring now to FIGS. 5 and 6, the bowl 20 of the food processor 10 is shown with a lid 228 secured thereto. The lid 228 includes a shell 232 and a feed tube 30 that extends upwardly from an outer surface 216 of the shell 232. The shell 232 has an opening 234 defined therein, which extends between the outer surface 216 and an inner surface 236 of the shell 232.

An adjustment assembly 306, like the adjustment assembly 106, is integrated into the lid 228 and is operable to vary the cutting thickness of the food processor 10 while the cutting assembly 16 is driven by the motor 14. The adjustment assembly 306 includes a user-operated control device 308 that is located outside of the processing chamber 26, as described in greater detail below. The adjustment assembly 306 also includes an actuation device 310 configured to move the rotating disk 34 relative to the cutting blade 32.

The actuation device 310 includes an actuator 320 having an upper end 322 positioned above the lid 228 to a lower end 324 positioned in the processing chamber 26. The actuator 320 includes a shaft 326 and a bearing 150 secured to the shaft 326 at the lower end 324. The bearing 150 permits relative axial motion between the actuator 320 and the rotating disk 34 while being loaded axially between the shaft 326 and the rotating disk 34. As shown in FIG. 5, an outer surface 328 of the shaft 326 has a plurality of horizontal notches 330 defined therein along the length of the shaft 326. The notches 330 are engaged by a control button 340 of the user-operated control device 308, as described in greater detail below.

The user-operated control device 308 of the adjustment assembly 306 includes a push button 332 attached to the upper end 322 of the actuator 320. The push button 332 includes a plurality of contours 334 sized to receive a fingertip of the user such that the user may exert a downward force, as indicated by arrow 336, on actuator 320 to advance the actuator 320 downward relative to the lid 228. It should be appreciated that in other embodiments the push button may take other forms. For example, the push button may include a head element to provide greater surface area to the user for actuating the button.

As described above, the user-operated control device 308 also includes a control button 340 configured to move along the outer surface 216 of the lid 228. As shown in FIGS. 5 and 6, the button 340 has a body 342 that includes a contoured upper surface 344 and a lower surface 346 that contacts the outer surface 216 of the lid 228. The contoured upper surface 344 is configured to receive a fingertip of the user such that the user may advance the button 340 along the surface 216 as indicated by arrow 348 shown in FIG. 6.

A stop pin 350 of the adjustment assembly 306 is secured to the control button 340 and extends through an opening 352 defined in the lid shell 232. The stop pin 350 has a body 354 positioned in an upper compartment 356 defined in the shell 232. The stop pin 350 also includes a tip 358 configured to be received in each of the notches 330 defined in the shaft 326. When the stop pin 350 is positioned in one of the notches 330, the actuator 320 is prevented from moving relative to the lid 228. A biasing element, such as spring 362, is positioned between the body 354 of the stop pin 350 and an inner wall 360 of the shell 232. The spring 362 biases the pin 350 into engagement with one of the notches 330.

In use, the lid 228 is secured to the bowl 20 as shown in FIGS. 5 and 6, and a user operates the controls 18 to energize the motor 14 to rotate the output shaft 42 and the drive stem 48. Because the cutting assembly 16 is secured to the drive stem 48 via the central shaft 50, rotation of the output shaft 42 causes rotation of the cutting assembly 16. While the motor 14 is energized, the user may advance food items into the processing chamber 26 through the feed tube 30 to be cut by the spinning cutting assembly 16.

If the user desires to increase the cutting thickness during the cutting operation, the user may press down on the push button 332 in the direction indicated by arrow 336. When a predetermined amount of force is applied, the bias of the spring 362 of the adjustment assembly 306 is overcome and the stop pin 350 is withdrawn from the notches 330 so that the actuator 320 may be advanced downward relative to the lid 228, as shown in FIG. 5. As the user continues to apply force to the push button 332, the lower end 324 of the actuator 320 engages the upper surface 98 of the hub 70 to move the rotating disk 34 downward relative to the cutting blade 32. As a result, the distance D defined between the cutting edge 36 of the cutting blade 32 and the upper surface 40 of the rotating disk 34 increases, consequently increasing the thickness of food items being processed by the food processor 10.

The bearing 150 isolates the actuator 320 from the rotation of the cutting assembly 16 and transfers the downward force applied to the actuator 320 to the rotating disk 34, thereby causing the rotating disk 34 to move downward relative to the cutting blade 32. In that way, the user may adjust the cutting thickness while the cutting assembly 16 is driven by the motor 14 without interfering with the cutting operation. When the rotating disk 34 reaches a desired cutting position, the user releases the push button 332, and the spring 362 urges the pin 350 into the notch 330 corresponding to the desired cutting position to lock the actuator 320 (and hence the rotating disk 34) in position.

If, after increasing the cutting thickness, the user desires to decrease the cutting thickness during the cutting operation, the user may press the control button 340 to slide the button 340 in the direction indicated in FIG. 6 by arrow 348. As the button 340 is moved along the lid 228, the stop pin 350 is withdrawn from the notch 330, and the spring 92 of the cutting assembly 16 urges the rotating disk 34 to move upward relative to the cutting blade 32. As a result, the distance D defined between the cutting edge 36 and the upper surface 40 of the rotating disk 34 decreases, consequently decreasing the thickness of food items being processed by the food processor 10.

Figure 7:
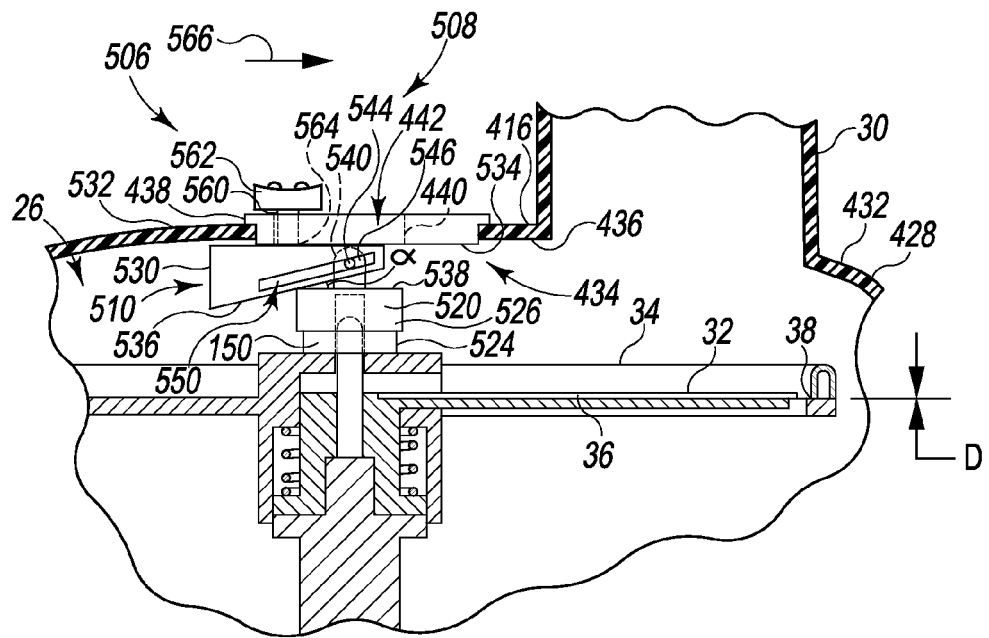
FIG. 7 is a partial cross-sectional side elevation view showing another embodiment of an adjustment assembly for the food processor of FIG. 1 with the cutting assembly in one position.
Figure 8:
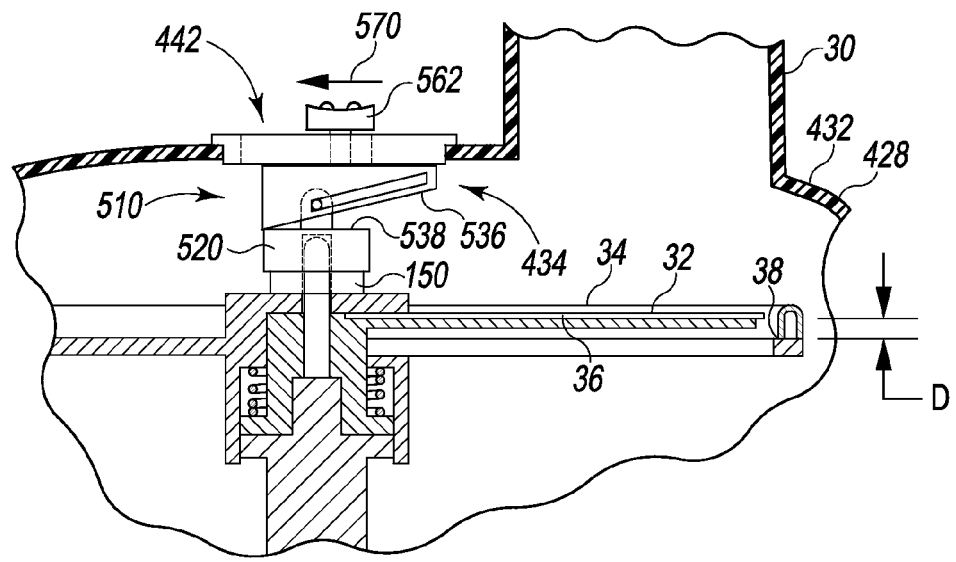
FIG. 8 is a view similar to FIG. 7 showing the cutting assembly in another position.

Referring now to FIGS. 7 and 8, the bowl 20 of the food processor 10 is shown with another removable lid (hereinafter lid 428) secured thereto. The lid 428 includes a shell 432 and a feed tube 30 that extends upwardly from an outer surface 416 of the shell 432. The shell 432 has an opening 434 defined therein, which extends between the outer surface 416 and an inner surface 436 of the shell 432. A sleeve 438 is positioned in the opening 434 and secured to the lid 428. The sleeve 438 has an inner wall 440, which defines a rectangular slot 442 that extends through the sleeve 438. It should be appreciated that the sleeve and the shell may be formed as a single, monolithic component or may be formed separately for later assembly.

A thickness adjustment assembly 506 is integrated into the lid 428 and is operable to vary the cutting thickness of the food processor 10 while the cutting assembly 16 is driven by the motor 14. The adjustment assembly 506 includes a user-operated control device 508 that is located outside of the processing chamber 26, as described in greater detail below. The adjustment assembly 506 also includes an actuation device 510 configured to move the rotating disk 34 relative to the cutting blade 32.

As shown in FIG. 7, the actuation device 510 includes an actuator 520 positioned in the processing chamber 26. The actuator 520 has a shaft 526 and a bearing 150 secured to the shaft 526 at a lower end 524 thereof. The bearing 150 permits relative axial motion between the actuator 520 and the rotating disk 34 while being loaded axially between the actuator 520 and the rotating disk 34.

The actuation device 510 of the adjustment assembly 506 also includes a beam 530 that connects the shaft 526 to the user-operated control device 508. The beam 530 includes an upper surface 532 that contacts a lower surface 534 of the sleeve 438 such that the beam 530 may slide along the lower surface 534. The beam 530 also includes an inclined or ramped bottom surface 536 that engages an upper surface 538 of the actuator 520. As shown in FIG. 5, an angle α is defined between the bottom surface 536 of the beam 530 and the upper surface 538 of the actuator 520.

An upper end 540 of the shaft 526 is positioned in a track (not shown) defined in the beam 530. The upper end 540 of the shaft 526 has a pair of pins 544 that extend horizontally from a side 546 of the shaft 526, and each pin 544 is received in a corresponding slot 550 defined in the beam 530. As shown in FIG. 5, the slope of the slot 550 substantially matches the angle α. It should be appreciated that in other embodiments the bottom surface of the beam 530 and shape of the slot 550 may take other geometric forms. For example, each may have a convex or arched shape.

The user-operated control device 508 of the adjustment assembly 506 includes a control lever 560 having a grip 562 positioned above the lid 428. The lever 560 extends downwardly through the slot 442 of the sleeve 438 and is secured at a lower end 564 to the beam 530. When the lever 560 is advanced along the slot 442 in the direction indicated by arrow 566 as shown in FIG. 7, the beam 530 is moved along the lower surface 534 of the sleeve 438. The movement of the beam 530 causes the ramped bottom surface 536 to slide relative to the upper surface 538 of the actuator 520, thereby exerting a downward force on the actuator 520 and causing the actuator 520 to move downward relative to the lid 428. It should be appreciated that in other embodiments the adjustment assembly 506 may include a locking mechanism to hold the control lever 560, beam 530, or other component of the actuation device or user-operated control device in position such that the cutting assembly 16 may be positively locked at a desired cutting position.

In use, the lid 428 is secured to the bowl 20 as shown in FIGS. 7 and 8, and a user operates the controls 18 to energize the motor 14 to rotate the output shaft 42 and the drive stem 48. Because the cutting assembly 16 is secured to the drive stem 48 via the central shaft 50, rotation of the output shaft 42 causes rotation of the cutting assembly 16. If the user desires to increase the cutting thickness during the cutting operation, the user may grasp the grip 562 to advance the lever 560 along the slot 442 of the sleeve 438 and thereby advance the beam 530 along the lower surface 534 of the sleeve 438. As the lever 560 is operated, the ramped bottom surface 536 of the beam 530 is moved relative to the upper surface 538 of the shaft 526 such that a downward force is exerted on the shaft 526 and the shaft 526 is moved downward relative to the lid 428.

The lower end 524 of the shaft 526 engages the upper surface 98 of the hub 70 and the rotating disk 34 is thereby moved downward relative to the cutting blade 32. As a result, the distance D defined between the cutting edge 36 and the upper surface 40 of the rotating disk 34 increases, thereby increasing the thickness of food items being processed by the food processor 10. The bearing 150 isolates the actuator 520 from the rotation of the cutting assembly 16 such that only the downward vertical motion of the actuator 520 is transferred to the rotating disk 34. In that way, the user may adjust the cutting thickness while the cutting assembly 16 is driven by the motor 14 without interfering with the cutting operation.

If the user desires to decrease the cutting thickness during the cutting operation, the user may grasp the grip 562 of the control lever 560 and move the lever 560 back in the direction indicated in FIG. 8 by arrow 570. As the control lever 560 is operated, the ramped bottom surface 536 of the beam 530 is moved relative to the upper surface 538 of the shaft 526, and the spring 92 urges the rotating disk 34 to move upward relative to the cutting blade 32. As a result, the distance D defined between the cutting edge 36 and the upper surface 40 of the rotating disk 34 decreases, thereby decreasing the thickness of food items being processed by the food processor 10.

Figure 9:
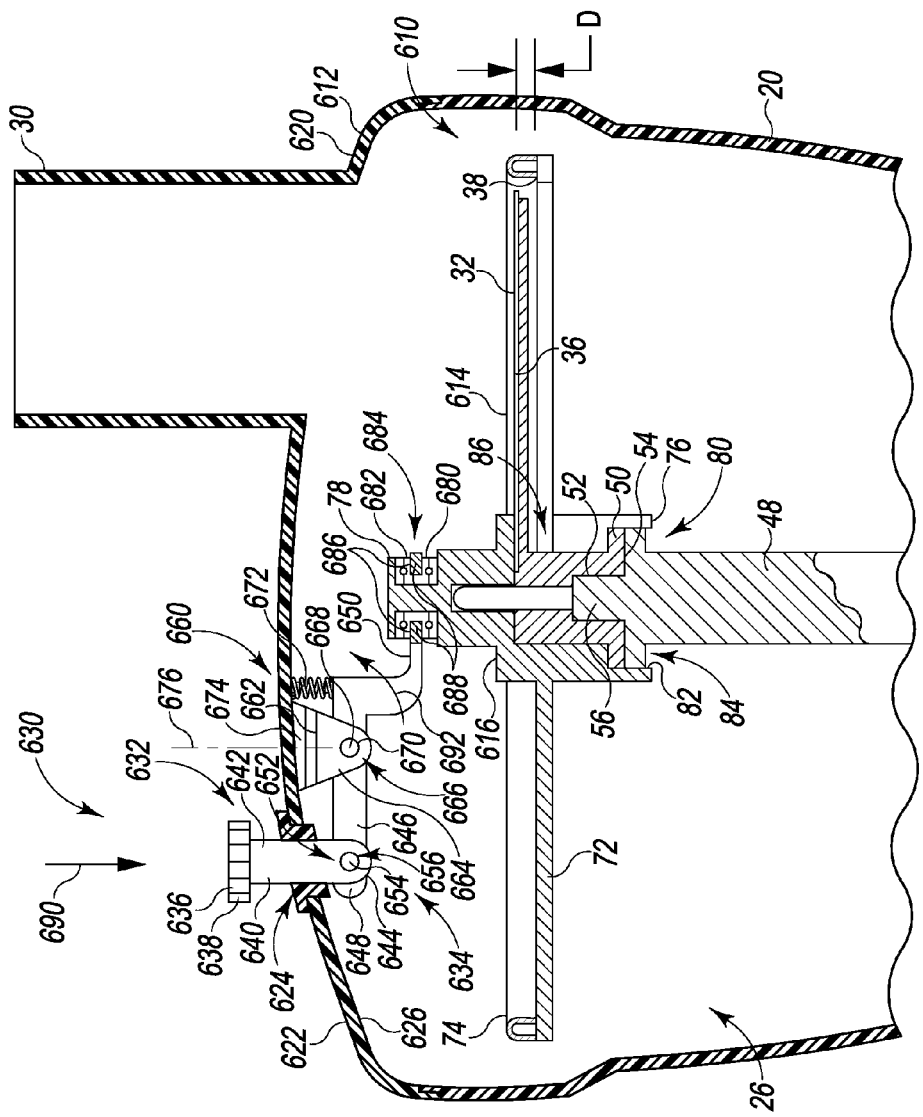
FIG. 9 is another partial cross-sectional side elevation view showing another embodiment of an adjustment assembly and another embodiment of a cutting assembly for the food processor of FIG. 1.

Referring now to FIG. 9, the food processor 10 is shown with another embodiment of a cutting assembly (hereinafter cutting assembly 610) positioned in the processing chamber 26 and another embodiment of a removable lid (hereinafter lid 612) secured to the bowl 20. Some features of the embodiment illustrated in FIG. 9 are substantially similar to those discussed above in reference to the embodiment of FIGS. 1-4. Such features are designated in FIG. 9 with the same reference numbers as those used in FIGS. 1-4.

The cutting assembly 610 includes a cutting blade 32, a central shaft 50, and a rotating disk 614. As shown in FIG. 9, the central shaft 50 has a socket 52 defined in a lower end 54 thereof, and the drive stem 48 of the food processor 10 has an upper end 56 that is keyed to match the configuration of the socket 52. When the drive stem 48 is secured to the cutting assembly 610 as shown in FIG. 9, the keyed upper end 56 of the stem 48 is received in the socket 52 of the central shaft 50. As such, rotation of the motor of the food processor 10 causes rotation of the cutting assembly 610. The cutting assembly 610 also includes a mounting arm 62 that extends outwardly from the central shaft 50, and the cutting blade 32 is secured to the upper surface of the mounting arm 62.

The rotating disk 614 of the cutting assembly 610 includes a central hub 616, a planar body 72 extending radially outward from the central hub 616, and a rim 74 extending upwardly from the outer perimeter of the planar body 72. The rotating disk 614 has a diameter that is slightly less than the inner diameter of the bowl 20 such that the rim 74 is positioned adjacent to, but is slightly spaced apart from, the inner wall of the bowl to permit rotation of the disk 614 within the bowl 20. As shown in FIG. 9, the hub 616 of the rotating disk 614 has a lower end 76 positioned below the planar body 72 and an upper end 78 positioned above the planar body 72. An opening 80 is defined in the lower end 76 of the hub 616, and an inner wall 82 extends inwardly from the opening 80 to define an aperture 84 in the hub 616. A pocket 86 is defined in hub 616 that opens into the aperture 84.

The rotating disk 614 and the cutting blade 32 are coupled together via the central shaft 50, which is positioned in the aperture 84 of the hub 616, and the mounting arm 62, which extends outwardly through the pocket 86 of the hub 70 and is positioned in an oblong opening 88 formed in the rotating disk 614. The central shaft 50, the mounting arm 62, and the hub 616 are keyed such that the cutting blade 32 is torsionally secured to the rotating disk 614. In that way, the blade 32 and disk 614 may be driven together by the motor (not shown) of food processor 10.

The rotating disk 614, like the rotating disk 34 shown in FIGS. 1-8, is configured to slide vertically relative to the blade 32 to adjust the cutting thickness of the cutting assembly 16, as indicated in FIG. 9 by arrow 90. Because the cutting blade 32 is fixed to the drive stem 48, the cutting blade 32 is maintained in its vertical position such that, as the rotating disk 614 moves downwardly or upwardly, the distance D defined between the cutting edge 36 of the cutting blade 32 and the upper surface 40 of the rotating disk 614 changes, thereby changing the cutting thickness such that food slices of different thicknesses may be produced.

As shown in FIG. 9, the lid 612 includes a shell 620 and a feed tube 30 that extends upwardly from an outer surface 622 of the shell 620. The shell 620 has a curved slot 624 defined therein that extends between the outer surface 622 and an inner surface 626 thereof. A thickness adjustment assembly 630 is integrated into the lid 612 and is operable to vary the cutting thickness of the food processor 10 while the cutting assembly 610 is driven by the motor of the food processor 10. The adjustment assembly 630 includes a user-operated control device 632 that is located outside of the processing chamber 26, as described in greater detail below. The adjustment assembly 630 also includes an actuation device 634 configured to move the rotating disk 614 relative to the cutting blade 32 when operated by the control device 632.

The user-operated control device 632, like the user-operated control device 108, is located outside of the processing chamber 26 so that the adjustment assembly 630 may be operated by the user while the lid 612 is secured to the bowl 20 and while the cutting assembly 610 is driven by the motor. As shown in FIG. 9, the control device 632 is embodied as a push button 636, which may be pressed by the user to change the cutting thickness of the cutting assembly 610 without removing the lid 612 from the bowl 20. The push button 636 has a grip 638 defined around its outer edge that may be grasped by the user.

The actuation device 634 of the adjustment assembly 630 includes a shaft 640 that is secured to the push button 636 at an upper end 642. The shaft 640 extends downwardly from the button 636 through the slot 624 defined in the lid 612 to a lower end 644 positioned in the processing chamber 26. The actuation device 634 also includes a lever 646 having one end 648 coupled to the shaft 640 and another end 650 coupled to the central hub 616 of the rotating disk 614 when the lid 612 is secured to the bowl 20. As shown in FIG. 9, the end 648 of the lever 646 is secured to the lower end 644 of the shaft 640 via a pivot joint 652. The pivot joint 652 includes a cylindrical pin 654 that is received in a pair of openings 656 defined in the shaft 640 and another pair of openings (not shown) defined in the lever 646. In that way, the lever 646 is configured to pivot relative to the end 644 of the shaft 640.

The actuation device 634 of the adjustment assembly 630 also includes a bracket 660 having a base 662 rotatively coupled to the shell 620 and a pair of support arms 664 extending from the base 662. The support arms 664 are coupled to the lever 646 via a pivot joint 666. The pivot joint 666 includes a cylindrical pin 668 that is received in an opening 670 defined in each support arm 664 and another pair of openings (not shown) that are defined in the lever 646. In that way, the lever 646 is configured to pivot relative to the bracket 660. As shown in FIG. 9, a biasing element, such as spring 672, is positioned between the lever 646 and the base 662 to bias the lever 646 in position relative to the bracket 660.

In the illustratively embodiment, a bearing 674 is secured to the base 662 of the bracket 660 and is coupled to the inner surface 626 of the lid shell 620. In that way, the bearing 674 rotatively couples the base 662 to the lid shell 620. The bearing 674 is illustratively embodied as a thrust bearing that permits relative axial motion between the bracket 660 and the lid shell 620. As shown in FIG. 9, the bearing 674 defines a longitudinal axis 676 about which the bearing 674 permits the bracket 660 (and hence, lever 646) to rotate, as indicated by arrows 678.

As described above, the lever 646 of the actuation device 634 has an end 650 that is coupled to the central hub 616 of the rotating disk 614 when the lid 612 is secured to the bowl 20. In the illustrative embodiment, the central hub 616 of the rotating disk 614 includes a slotted bearing 680 positioned in the upper end 78 thereof. The bearing 680 has an outer cylindrical surface 682 and a slot 684 that is defined therein. The slot 684 is defined by a pair of inner walls 686 extending inwardly from the surface 682. The lower end 644 of the lever 646 includes a pair of arms or prongs 688 that are configured to be positioned in the slot 684 of the bearing 680 when the lid 612 is secured to the bowl 20.

In use, the lid 612 is secured to the bowl 20 and the adjustment assembly 630 is rotated into engagement with the cutting assembly 610. To do so, the lid 612 is placed in contact with upper rim 22 of the bowl 20, and the user grasps the grip 638 of the push button 636 to move the shaft 640 along the slot 624 defined in the lid 612. As the shaft 640 is advanced along the slot 624, the lever 646 and the bracket 660 are rotated about the axis 676, thereby advancing the prongs 688 of the lever 646 into the slot 684 of the bearing 680 of the rotating disk 614. When the adjustment assembly 630 is engaged with the cutting assembly 610, the user may operate the controls of the food processor 10 to energize the motor of the food processor 10. As described above, because the cutting assembly 610 is secured to the motor via the central shaft 50, the cutting assembly 610 is rotated when the motor is energized. While the motor is energized, the user may advance food items into the processing chamber 26 through the feed tube 30 to be cut by the spinning cutting assembly 610.

Because the adjustment assembly 630 is attached to the cutting assembly 610 via the bearing 680, the adjustment assembly 630 is isolated from the rotation of the cutting assembly 610. If the user desires to decrease the cutting thickness during the cutting operation, the user may press the push button 636 of the control device 632 in the direction indicate by arrow 690. When a predetermined amount of force is applied, the bias of the spring 672 of the adjustment assembly 630 is overcome and the lever 646 is pivoted in the direction indicated by arrow 692. As the lever 646 pivots, the prongs 688 engage the inner walls 686 of the bearing 680 to move the rotating disk 614 upward relative to the cutting blade 32. As a result, the distance D defined between the cutting edge 36 and the upper surface 40 of the rotating disk 614 decreases, consequently decreasing the thickness of food items being processed by the food processor 10. It should be appreciated that in other embodiments the adjustment assembly 630, like the embodiments of FIGS. 1-8, may include a locking mechanism to hold the lever 646, shaft 640, or some other component of the adjustment assembly 630 in position such that the cutting assembly 610 may be positively locked at a desired cutting position.

If, after decreasing the cutting thickness, the user desires to increase the cutting thickness during the cutting operation, the user may release the push button 636. The spring 672 urges the lever 646 to pivot downward such that the rotating disk 614 moves downward relative to the cutting blade 32. As a result, the distance D defined between the cutting edge 36 and the upper surface 40 of the rotating disk 614 increases, thereby increasing the thickness of food items being processed by the food processor 10.

Referring now to FIGS. 10-13, additional embodiments of lids for the food processor 10 are shown. Each lid includes another embodiment of a thickness adjustment assembly that may be used with, for example, the cutting assembly 16 discussed above in regard to FIGS. 1-4. Some features of the embodiments illustrated in FIGS. 10-13 are substantially similar to those discussed above in reference to the embodiments of FIGS. 1-9. Such features are designated in FIGS. 10-13 with the same reference numbers as those used in FIGS. 1-9.

Figure 10:
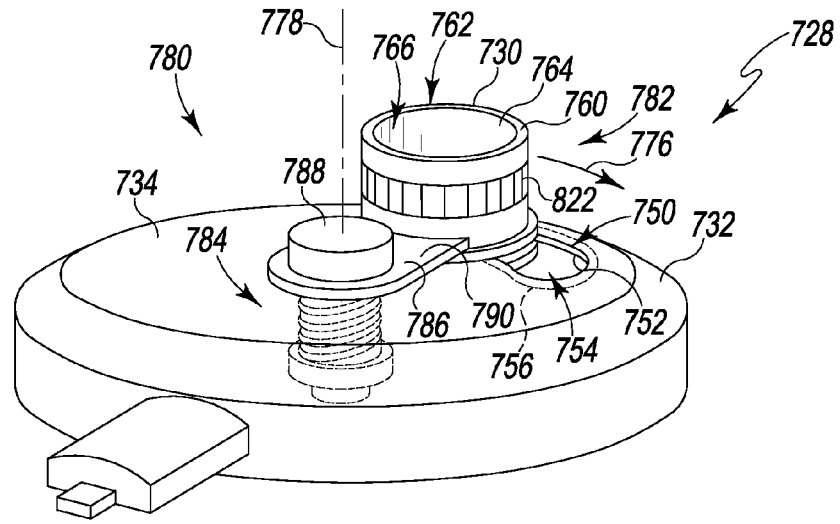
FIG. 10 is a perspective view of a lid including another embodiment of an adjustment assembly for the food processor of FIG. 1.
Figure 11:
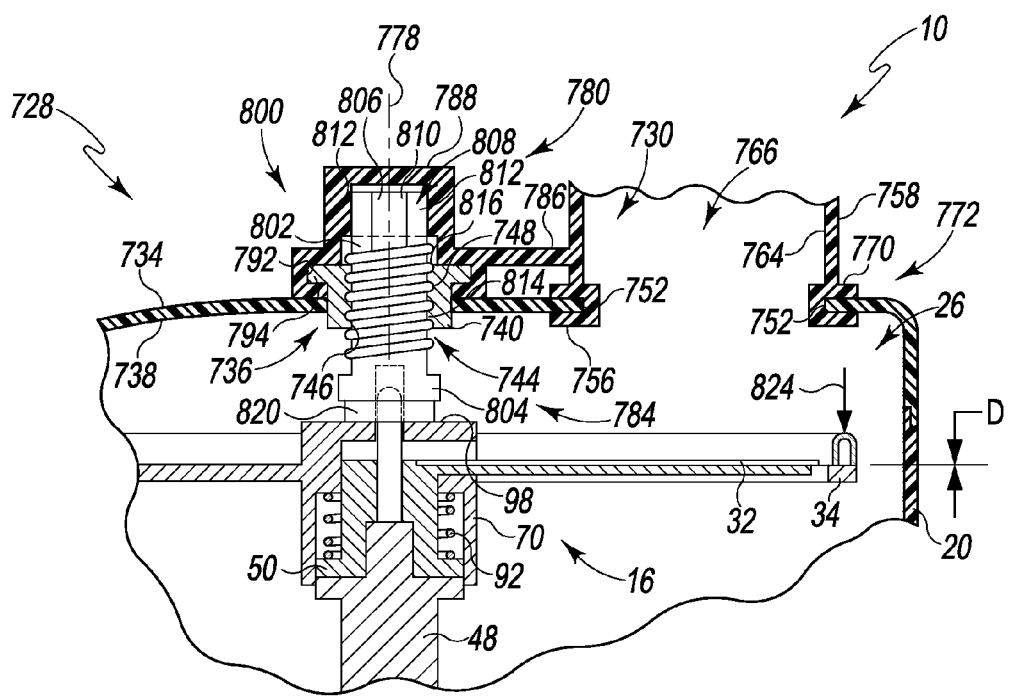
FIG. 11 is a partial cross-sectional side elevation view showing the lid of FIG. 10 secured to the bowl of the food processor.

Referring now to FIGS. 10 and 11, another removable lid (hereinafter lid 728) for the food processor 10 is shown. The lid 728 includes a shell 732 and a feed tube 730 that slides relative to an upper surface 734 of the shell 732. As shown in FIG. 11, the shell 732 has a central passageway 736 defined therein, which extends between the upper surface 734 and an inner surface 738 of the shell 732. A hollow sleeve 740 is positioned in the passageway 736 and is secured to the shell 732. The hollow sleeve 740 has an inner wall 742 that defines a passageway 744 extending through the sleeve 740. The inner wall 746 of the sleeve 740 is internally-threaded, with a plurality of internal threads 748 defined in a cylindrical surface thereof. It should be appreciated that the sleeve and the shell may be formed as a single, monolithic component or formed separately for later assembly. The shell 732 has another opening 750 defined in the upper surface 734 between the central passageway 736 and the outer edge of the shell 732. A number of inner walls 752 extend downwardly from the opening 750 to define a curved slot 754 through the shell 732.

The feed tube 730 of the lid 728 includes a cover plate 756 that is positioned below the inner surface 738 of the shell 732 and a body 758 extending upwardly from the cover plate 756. As shown in FIG. 10, the body 758 of the feed tube 730 extends through the curved slot 754 defined in the shell 732. The body 758 has an upper surface 760 and an opening 762 defined therein. An inner wall 764 extends downwardly from the opening 762 to define a passageway 766 through the body 758 of the feed tube 730. As shown in FIG. 11, the passageway 766 opens into the processing chamber 26 of the food processor 10. In use, a user may advance food items down the passageway 766 of the feed tube 730 into the processing chamber 26 to be processed by the cutting assembly 16.

The feed tube 730 also includes a flange 770 that extends outwardly from the body 758, and a channel 772 is defined between the flange 770 and the cover plate 756. The inner walls 752 of the shell 732 are received in the channel 774 of the feed tube 730, and the channel 772 is sized such that the feed tube 730 is permitted to slide relative to the shell 732 along the curved slot 754. In that way, the feed tube 730 is configured rotate relative to the shell 732 about an axis 778 extending through the shell 732.

The cover plate 756 of the feed tube 730 is sized to prevent a user from accessing the processing chamber 26 through the slot 754. As shown in FIGS. 10 and 11, the cover plate 756 extends beyond the edges of the slot 754 so that as the body 758 of the feed tube 730 slides along the slot 754, the cover plate 756 moves with the body 758 to cover the exposed sections of the slot 754. It should be appreciated that in other embodiments the arrangement of the cover plate and the flange may be reversed such that the cover plate is positioned on the upper surface of the shell and the flange positioned below.

The lid 728 has a thickness adjustment assembly 780 that is attached to the shell 732. The adjustment assembly 780, like the adjustment assemblies described above, is operable to vary the cutting thickness of the food processor 10 while the cutting assembly 16 is driven by the motor of the food processor 10. The adjustment assembly 780 includes a user-operated control device 782 that is located outside of the processing chamber 26 of the food processor 10 and an actuation device 784 configured to move the rotating disk 34 relative to the cutting blade 32 when operated by the control device 782.

In the illustrative embodiment of FIGS. 10 and 11, the user-operated control device 782 includes the feed tube 730 and a control lever 786 connecting the feed tube 730 with the actuation device 784. The control lever 786 includes a cap 788 and an arm 790 extending between the body 758 of the feed tube 730 and the cap 788. The cap 788, like the feed tube 730, is configured to rotate about the axis 778. In the illustrative embodiment, the cap 788 has a ring-shaped channel 792 defined therein that receives a circular upper flange 794 of the sleeve 740. When the feed tube 730 is advanced along the curved slot 754, the movement of the arm 790 causes the cap 788 to rotate about the axis 778 with the feed tube 730.

The actuation device 784 of the adjustment assembly 780 includes an actuator 800 that is configured to be rotatively coupled to the cutting assembly 16. The actuator 800 illustratively includes a shaft 802 that is positioned in the passageway 744 of the sleeve 740. The shaft 802 has a lower end 804 positioned in the processing chamber 26 of the food processor 10 and an upper end 806 positioned in a socket 808 defined in the cap 788. As shown in FIG. 11, the upper end 806 of the shaft 802 is keyed to substantially match the configuration of the socket 808 such that rotation of the cap 788 by the feed tube 730 causes the rotation of the shaft 802. In the illustrative embodiment, the upper end 806 of the shaft 802 includes two flat surfaces 810 and two curved surfaces 812, and the sidewalls of the socket 808 define a corresponding geometric shape that receives the upper end 806 of the shaft 802.

It should also be appreciated that in other embodiments other methods of attachment may be used to secure the shaft to the cap. For example, a pair of tabs may extend from the upper end of the shaft, and those tabs may be received in a corresponding socket defined in the cap.

As shown in FIG. 11, the shaft 802 of the actuator 800 has an outer surface 814 that is externally-threaded with a plurality of external threads 816 formed thereon. The internal threads 748 of the sleeve 740 correspond to the external threads 816 of the shaft 802 and threadingly engage the external threads 816 of the shaft 802. Because the feed tube 730 is connected to the actuator 800 via the control lever 786, movement of the feed tube 730 along the curved slot 754 causes the actuator 800 to move upwardly and downwardly within the passageway 744. For example, clockwise movement of the feed tube 730 (i.e., in the direction indicated by arrow 776) may cause downward movement of the actuator 800, while counter-clockwise movement of the feed tube 730 may cause upward movement of the actuator 800.

As shown in FIG. 11, the lower end 804 of the actuator 800 is advanced into contact with an upper surface 98 of a hub 70 of the rotating disk 34 when the lid 728 is secured to the bowl 20. The lower end 804 of the actuator 800 is configured to be rotatively coupled to the rotating disk 34 such that the actuator 800 does not rotate with the cutting assembly 16 as the cutting assembly 16 is driven by the motor 14. In the illustrative embodiment, the actuator 800 has a bearing 820 attached to the shaft 802. The bearing 820 is illustratively embodied as a thrust bearing that permits relative axial motion between the actuator 800 and the rotating disk 34 while being loaded axially between the shaft 802 and the rotating disk 34. It should be appreciated that in other embodiments the bearing 820 may take other forms. It should also be appreciated that in other embodiments the bearing may be secured to the rotating disk rather than the shaft.

In use, the lid 728 is secured to the bowl 20 as shown in FIG. 11, and a user operates the controls (not shown) to energize the motor to rotate the drive stem 48. As described above, because the cutting assembly 16 is secured to the motor of the food processor 10 via the drive stem 48 and the central shaft 50, the motor causes the rotation of the cutting assembly 16. While the motor is energized, the user may advance food items into the processing chamber 26 through the feed tube 730 to be cut by the spinning cutting assembly 16.

If the user desires to increase the cutting thickness during the cutting operation, the user may grasp a grip 822 formed on the outer surface of the body 758 of the feed tube 730 and advance the body 758 along the slot 754. As the body 758 of the feed tube 730 is advanced along the slot 754 in the direction indicated by arrow 776 in FIG. 10, the feed tube 730 is rotated about the axis 778, and the rotation of the feed tube 730 causes rotation of the cap 788 of the control lever 786. As the cap 788 is rotated, the sidewalls of the socket 808 engage the upper end 806 of the actuator 800, thereby causing the shaft 802 to rotate and the actuator 800 to advance downward. The lower end 804 of the actuator 800 engages the upper surface 98 of the hub 70 to move the rotating disk 34 downward relative to the cutting blade 32 as indicated in FIG. 11 by arrow 824.

As a result, the distance D defined between the cutting edge 36 and the upper surface 40 of the rotating disk 34 increases and thereby increases the thickness of food items being processed by the food processor 10. The bearing 820 isolates the actuator 800 from the rotation of the cutting assembly 16 and isolates the cutting assembly 16 from the rotation of the actuator 800 such that only the vertical motion of the actuator 800 is transferred to the rotating disk 34. In that way, the user may adjust the cutting thickness while the cutting assembly 16 is driven by the motor 14 without interfering with the cutting operation.

If the user desires to decrease the cutting thickness during the cutting operation, the user may grasp the grip 822 of the feed tube 730 and slide the feed tube 730 in the direction opposite arrow 776. As the feed tube 730 is moved, the actuator 800 is advanced upward, and the spring 92 of the cutting assembly 16 urges the rotating disk 34 to move upward relative to the cutting blade 32. As a result, the distance D defined between the cutting edge 36 and the upper surface 40 of the rotating disk 34 decreases, thereby decreasing the thickness of food items being processed by the food processor 10.

It should be appreciated that the lid may include different embodiments of a feed tube, which may be operated to control the actuation device 784 and thereby change the cutting thickness. For example, rather than being configured to rotate about the central axis 778 of the lid, the feed tube may be configured to slide inwardly and outwardly relative to the outer edge of the lid. In another embodiment, a user might move the feed tube downward to adjust the cutting thickness. In yet another embodiment, which is illustratively shown in FIGS. 12 and 13, the feed tube may be configured to rotate about its own axis to adjust the cutting thickness.

Figure 12:
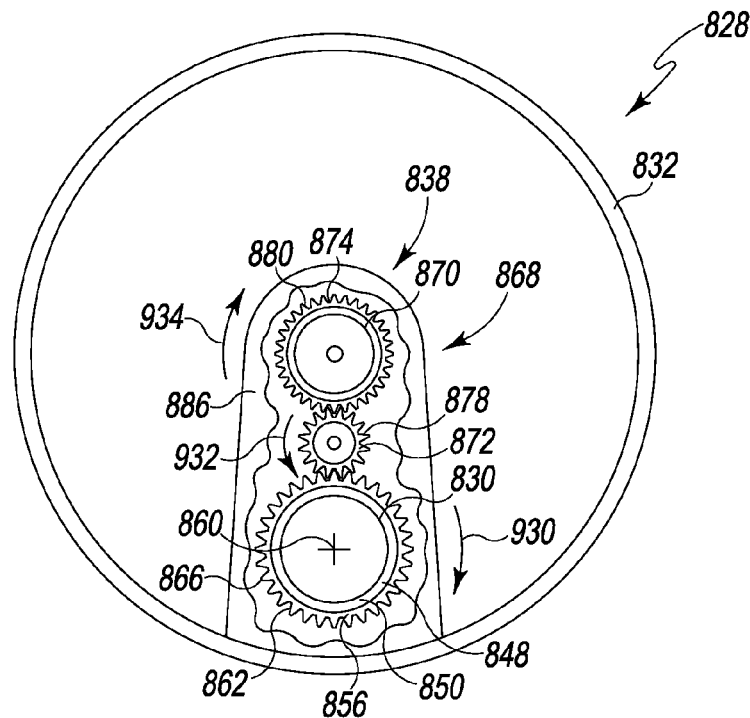
FIG. 12 is a bottom plan view of a lid including another embodiment of an adjustment assembly for the food processor of FIG. 1.
Figure 13:
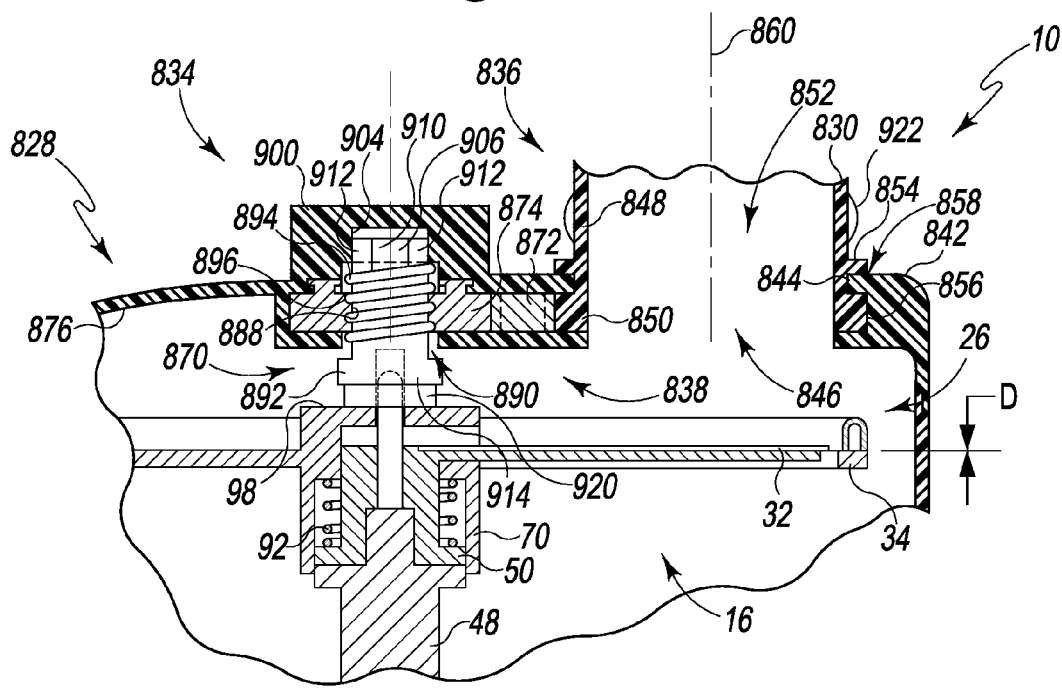
FIG. 13 is a partial cross-sectional side elevation view showing the lid of FIG. 12 secured to the bowl of the food processor.

Referring now to FIGS. 12 and 13, another removable lid (hereinafter lid 828) for the food processor 10 is shown. The lid 828 includes a shell 832, a feed tube 830 attached to the shell 832, and a thickness adjustment assembly 834 operable to vary the cutting thickness of the food processor 10 while the cutting assembly 16 is driven by the motor (not shown) of the food processor 10. The adjustment assembly 834 has a user-operated control device 836, which includes the feed tube 830 and is operable by a user to control an actuation device 838 to move the rotating disk 34 relative to the cutting blade 32.

The shell 832 of the lid 828 has an opening 840 defined in the upper surface 842, and a circular inner wall 844 extends downwardly from the upper surface 842 to define a cylindrical passageway 846 through the shell 832. The feed tube 830 includes a body 848 having a lower end 850 positioned in the cylindrical passageway 846. The body 848 of the feed tube 830 extends upwardly from the lower end 850 to an upper end (not shown) positioned above the upper surface 842 of the shell 832. As shown in FIG. 13, a vertical passageway 852 is defined in the body 848 of the feed tube 830, and the vertical passageway 852 opens into the processing chamber 26. In use, a user may advance food items down the passageway 852 of the feed tube 830 into the processing chamber 26 to be processed by the cutting assembly 16.

A pair of flanges 854, 856 extends outwardly from the body 848 of the feed tube 830 and defines a channel 858 therebetween. The inner wall 844 of the shell 832 is received in the channel 858 of the feed tube 830, and the channel 858 is sized such that the feed tube 830 is permitted to rotate relative to the shell 832 about a longitudinal axis 860 extending through the body 848. As shown in FIG. 12, the lower flange 856 of the feed tube 830 has a gear feature 862 that includes a plurality of teeth 866 formed thereon.

The actuation device 838 of the adjustment assembly 834 includes a gear assembly 868 that engages the gear feature 862 of the feed tube 830 and an actuator 870 that is configured to be rotatively coupled to the cutting assembly 16. The gear assembly 868 includes a pair of gears 872, 874, which are pivotally coupled to a lower surface 876 of the shell 832. Each of the gears 872, 874 is an external gear having a plurality of teeth 878, 880, respectively, defined thereon. As shown in FIG. 12, the teeth 878, 880 are interdigitated such that rotation of the gear 872 causes rotation of the gear 874. The teeth 878 of the gear 872 are also intedigitated with the teeth 866 of the feed tube 830 such that rotation of the feed tube 830 about the axis 860 causes rotation of the gears 872, 874. The gears 872, 874 of the gear assembly 868 are positioned in a gear box 886 attached to the lower surface 876 of the shell 832.

As shown in FIG. 13, the gear 874 of the gear assembly 868 has an inner wall 888 that defines a central passageway 890 therethrough. The actuator 870 of the actuation device 838 includes a shaft 892 that is positioned in the central passageway 890 of the gear 874. The shaft 892 is externally-threaded with a plurality of external threads 894 formed thereon, and the gear 874 has a corresponding plurality of internal threads 896 formed on the inner wall 888. The external threads 894 of the shaft 892 threadingly engage the internal threads 896 of the gear 874.

The shell 832 of the lid 828 also includes a central cap 900 that extends upwardly from the upper surface 842 of the shell 832. The cap 900 has a number of inner walls 902 that define a socket 904 therein. The actuator 870 has an upper end 906 that is positioned in the socket 904, and the upper end 906 of the shaft 892 is keyed to substantially match the configuration of the socket 904 such that rotation of the shaft 892 is prevented. In the illustrative embodiment, the upper end 906 includes two flat surfaces 910 and two curved surfaces 912. The inner walls 902 of the cap 900 define a corresponding geometric shape that receives the upper end 906.

Because the feed tube 830 is connected to the actuator 870 via the gear assembly 868, rotation of the feed tube 830 about the axis 860 causes rotation of the gear 874 and movement of the actuator 870 upwardly and downwardly within the passageway 890. For example, clockwise movement of the feed tube 830 may cause downward movement of the actuator 870, while counter-clockwise movement of the feed tube 830 may cause upward movement of the actuator 870.

As shown in FIG. 13, the actuator 870 of the adjustment assembly 834 also has a lower end 914 that is positioned in the processing chamber 26 of the food processor 10 and is configured to be rotatively coupled to the cutting assembly 16 such that the actuator 870 does not rotate with the cutting assembly 16 as the cutting assembly 16 is driven by the motor 14. In the illustrative embodiment, the actuator 870 has a bearing 920 attached to the shaft 892. The bearing 920 is illustratively embodied as a thrust bearing that permits relative axial motion between the actuator 870 and the rotating disk 34 while being loaded axially between the shaft 892 and the rotating disk 34. It should be appreciated that in other embodiments the bearing 920 may take other forms. It should also be appreciated that in other embodiments the bearing may be secured to the rotating disk rather than the shaft.

In use, the lid 828 is secured to the bowl 20 as shown in FIG. 13, and a user operates the controls (not shown) to energize the motor to rotate the drive stem 48. While the motor is energized, the user may advance food items into the processing chamber 26 through the feed tube 830 to be cut by the spinning cutting assembly 16.

If the user desires to increase the cutting thickness during the cutting operation, the user may grasp a grip 922 formed on the outer surface of the body 848 of the feed tube 830 and rotate the feed tube 830 about the axis 860. As the feed tube 830 is rotated about the axis 860 in the direction indicated by arrow 930, the engagement between the gear feature 862 of the feed tube 830 and the gear 872 causes the gears 872, 874 to rotate as indicated by arrows 932, 934. As the gear 872 is rotated, the actuator 870 is advanced downward such that the bearing 920 of the actuator 870 engages the upper surface 98 of the hub 70 of the rotating disk 34. While the bearing 920 isolates the shaft 892 from the rotation of the cutting assembly 16, the actuator 870 pushes downward on the rotating disk 34 to move the rotating disk 34 relative to the cutting blade 32. As a result, the distance D defined between the cutting edge 36 of the cutting blade 32 and the upper surface 40 of the rotating disk 34 increases and thereby increases the thickness of food items being processed by the food processor 10. In that way, the user may adjust the cutting thickness while the cutting assembly 16 is driven by the motor without interfering with the cutting operation.

If the user desires to decrease the cutting thickness during the cutting operation, the user may grasp the grip 922 of the feed tube 830 and rotate the feed tube 830 in direction opposite arrow 930. As the feed tube 830 is rotated, the actuator 870 is advanced upward, and the spring 92 urges the rotating disk 34 to move upward relative to the cutting blade 32. As a result, the distance D defined between the cutting edge 36 and the upper surface 40 of the rotating disk 34 decreases, thereby decreasing the thickness of food items being processed by the food processor 10.

Referring now to FIGS. 14-17, another embodiment of a food processor (hereinafter food processor 1010) is shown. Some features of the embodiment illustrated in FIGS. 14-17 are substantially similar to those discussed above in reference to the embodiments of FIGS. 1-13. Such features are designated in FIGS. 14-17 with the same reference numbers as those used in FIGS. 1-13.

The food processor 1010 has a base 12 that houses a motor 14 and a control unit. Under the control of the control unit, the motor 14 drives a cutting assembly 16 to cut food items such as cheeses, meats, fruits, and vegetables. The base 12 also includes one or more buttons, switches, dials, or other types of controls 18. A user operates the controls 18 to control the operation of the motor 14 and hence the food processor 1010.

The food processor 1010 also includes a removable receptacle or bowl 1020 that is secured to the base 12. The bowl 1020 has a bottom surface 1022 and a side wall 1024 that extends upwardly from the bottom surface 1022 to an upper rim 1026. An inner surface 1028 of the side wall 1024 cooperates with the bottom surface 1022 to define a processing chamber 26 where food items may be processed by the cutting assembly 16. The food processor 1010 also includes a removable lid 1030 that is configured to be secured to the rim 1026 of the bowl 1020. In that way, the removable lid 1030 encloses the processing chamber 26. The lid 1030 has a feed tube 1032 formed thereon through which food items such as fruits and vegetables may be inserted into the bowl 1020 to be processed by the food processor 1010.

The bowl 1020, the lid 1030, and the feed tube 1032 are generally made of a transparent or translucent plastic material so that the contents of the food processor 1010 can be viewed by a user without removing the lid 1030 from the bowl 1020. Moreover, one or more locking mechanisms may be used to lock the bowl to the base 12 and the lid 1030 to the bowl 1020.

Figure 14:
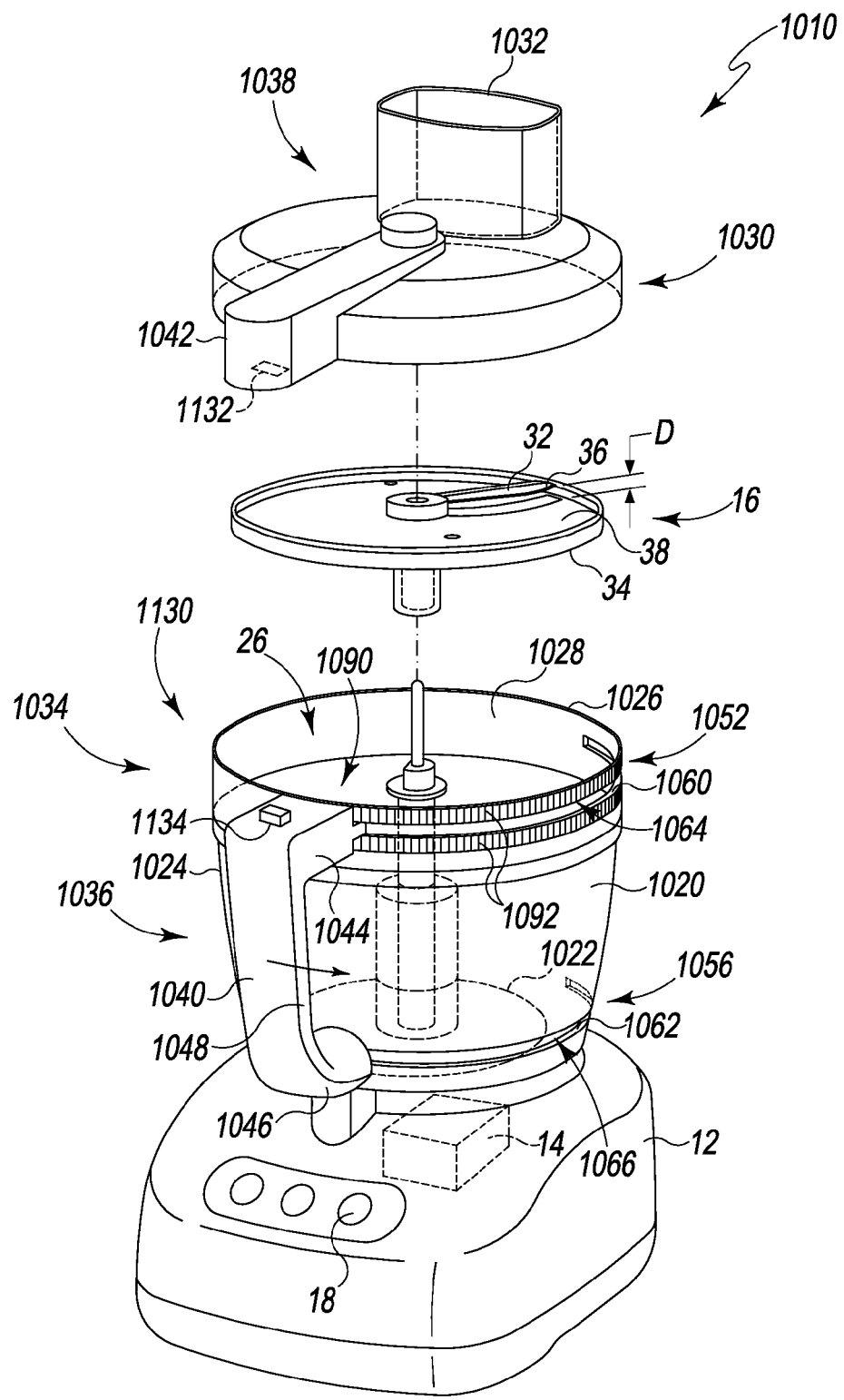
FIG. 14 an exploded, perspective view of another embodiment of a food processor.

As shown in FIG. 14, the cutting assembly 16 includes a cutting blade 32 and a rotating disk 34. A vertical distance, D, between the cutting edge 36 of the cutting blade 32 and the upper surface 38 of the rotating disk 34 defines a cutting thickness of food items processed by the cutting assembly 16. The position of the rotating disk 34 relative to the cutting blade 32 may be controlled by a thickness adjustment assembly 1034. The thickness adjustment assembly 1034 includes a user-operated control device 1036 that is configured to control an actuation device 1038, and the actuation device 1038 is operable to move the rotating disk 34 relative to the cutting blade 32.

The user-operated control device 1036 of the food processor 1010 includes a handle 1040 that is attached to the side wall 1024 of the bowl 1020 and a control lever 1042 that is attached to the lid 1030. The handle 1040 includes an upper arm 1044, a lower arm 1046, and a grip 1048 positioned therebetween. The grip 1048 is sized to be grasped by a user to facilitate placement of the bowl 1020 on the base 12 and change the cutting thickness of cutting assembly 16, as described in greater detail below.

Figure 15:
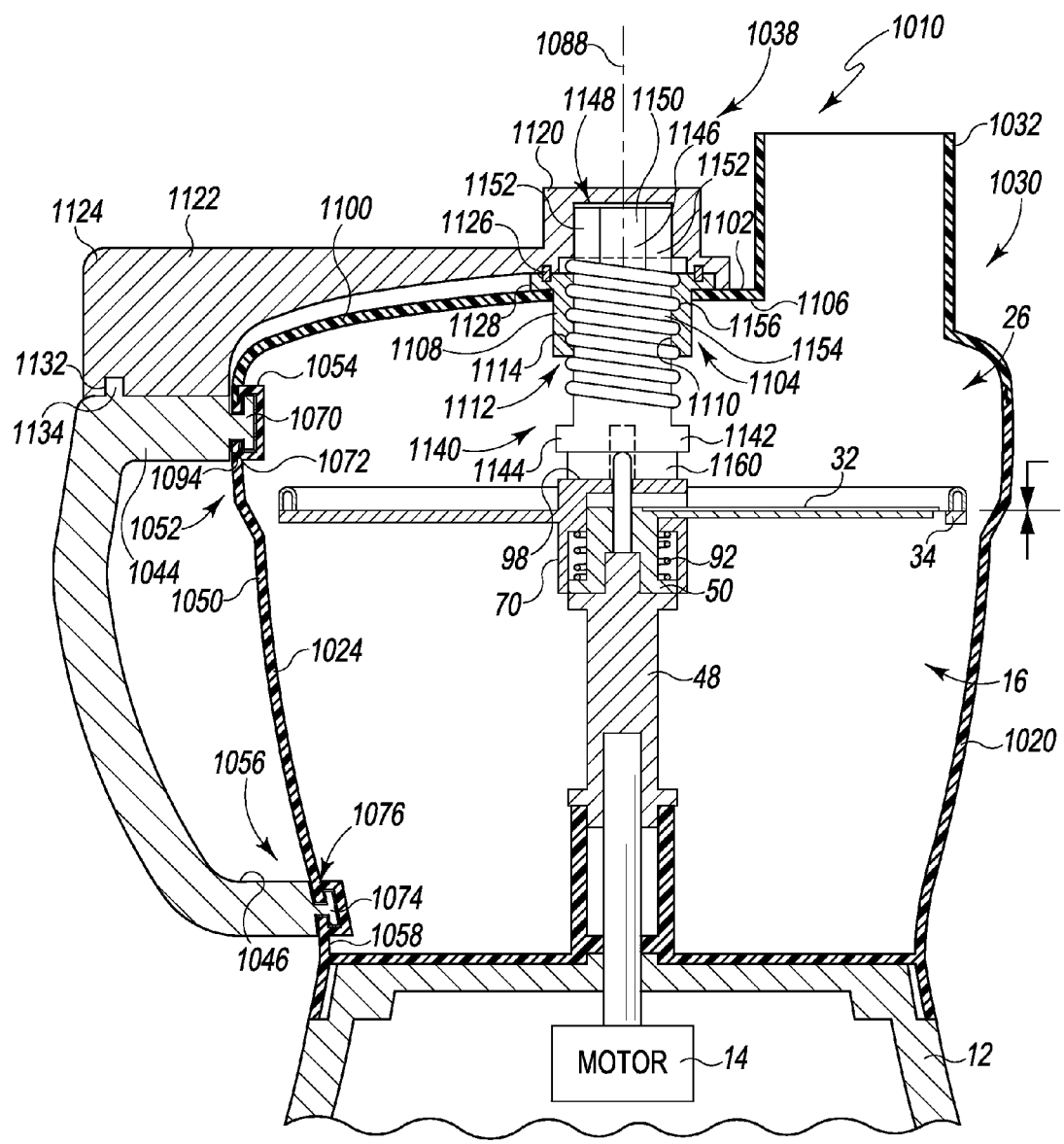
FIG. 15 is a partial cross-sectional side elevation view of the food processor of FIG. 14.

As shown in FIG. 15, the side wall 1024 of the bowl 1020 includes an outer surface 1050. The outer surface 1050 of the bowl 1020 has an opening 1052 that is defined in the upper end 1054 thereof and another opening 1056 that is defined in the lower end 1058 of the side wall 1024. A number of inner walls 1060, 1062 extend inwardly from the openings 1052, 1056, respectively, to define a pair of tracks 1064, 1066 in the side wall 1024.

As shown in FIG. 15, the upper arm 1044 of the handle 1040 has an end 1070 that is received in the track 1064 defined in the side wall 1024. A pair of channels 1072 is defined in the end 1070 of the upper arm 1044, and the upper and lower inner walls 1060 of the bowl 1020 are received in the channels 1072. Similarly, the lower arm 1046 of the handle 1040 has an end 1074 that is received in the track 1066 defined in the side wall 1024. A pair of channels 1076 is defined in the end 1074 of the lower arm 1046, and the upper and lower inner walls 1062 of the bowl 1020 are received in the channels 1076. The channels 1072, 1076 are sized such that the handle 1040 is permitted to slide relative to the side wall 1024 along the tracks 1064, 1066 and thereby rotate about a longitudinal axis 1088 of the bowl 1020.

The bowl 1020 of the food processor 1010 also includes a locking mechanism 1090 that inhibits movement of the handle 1040. In the illustrative embodiment, the locking mechanism 1090 includes a plurality of ribs 1092 formed on the outer surface 1050 of the side wall 1024 above and below the track 1064. The locking mechanism 1090 also includes a corresponding plurality of ribs 1094 defined on the end 1070 of the upper arm 1044. The ribs 1094 of the arm 1044 extend into the channels 1072 to engage with the ribs 1092, thereby inhibiting the movement of the handle 1040 along the tracks 1064, 1066. It should be appreciated that in other embodiments the locking mechanism may take the other forms, such as, for example, an arrangement of pins and slots that lock the handle 1040 in position or inhibit movement of the handle 1040 to thereby maintain the cutting assembly 16 in a cutting position.

The lid 1030 of the food processor 1010 includes a shell 1100, and the feed tube 1032 extends upwardly from an upper surface 1102 of the shell 1100. As shown in FIG. 15, the shell 1100 has a central passageway 1104 defined therein, which extends between the upper surface 1102 and an inner surface 1106 of the shell 1100. A hollow sleeve 1108 is positioned in the passageway 1104 and is secured to the shell 1100. The hollow sleeve 1108 has an inner wall 1110 that defines a passageway 1112 extending through the sleeve 1108. The inner wall 1110 of the hollow sleeve 1108 is internally-threaded, with a plurality of internal threads 1114 defined in a cylindrical surface thereof. It should be appreciated that the sleeve and the shell may be formed as a single, monolithic component or formed separately for later assembly.

As described above, the lid 1030 also includes a control lever 1042 of the adjustment assembly 1034. The control lever 1042 includes a cap 1120 and an arm 1122 that extends outwardly therefrom to an end 1124 positioned beyond the outer perimeter of the shell 1100. The cap 1120 is configured to rotate about the axis 1088 when the lid 1030 is secured to the bowl 1020. In the illustrative embodiment, a snap ring 1126 couples the cap 1120 to a circular upper flange 1128 of the sleeve 1108.

The control lever 1042 is configured to be secured to the handle 1040 via a locking mechanism 1130. In the illustrative embodiment, the locking mechanism 1130 includes an aperture 1132 defined in the end 1124 of the arm 1122 of the control lever 1042. The locking mechanism 1130 also includes a pin 1134 extending upwardly from the upper arm 1044 of the handle 1040. When the lid 1030 is secured to the bowl 1020 as shown in FIG. 15, the pin 1134 is received in the aperture 1132, thereby torsionally securing the control lever 1042 to the handle 1040. As result, when the lid 1030 is secured to the bowl 1020, rotation of the handle 1040 about the axis 1088 causes rotation of the control lever 1042.

As described above, the adjustment assembly 1034 also includes an actuation device 1038. The actuation device 1038 includes an actuator 1140 that is configured to be rotatively coupled to the cutting assembly 16. The actuator 1140 illustratively includes a shaft 1142 that is positioned in the passageway 1112 of the sleeve 1108. The shaft 1142 has a lower end 1144 positioned in the processing chamber 26 of the food processor 1010 and an upper end 1146 positioned in a socket 1148 defined in the cap 1120. As shown in FIG. 15, the upper end 1146 of the shaft 1142 is keyed to substantially match the configuration of the socket 1148 such that rotation of the control lever 1042 (and hence the cap 1120) by the handle 1040 causes rotation of the shaft 1142. In the illustrative embodiment, the upper end 1146 of the shaft 1142 includes two flat surfaces 1150 and two curved surfaces 1152, and the sidewalls of the socket 1148 define a corresponding geometric shape that receives the upper end 1146 of the shaft 1142.

It should also be appreciated that in other embodiments other methods of attachment may be used to secure the shaft to the cap. For example, a pair of tabs may extend from the upper end of the shaft, and those tabs may be received in a corresponding socket defined in the cap.

As shown in FIG. 15, the shaft 1142 of the actuator 1140 has an outer surface 1154 that is externally-threaded with a plurality of external threads 1156 formed thereon. The internal threads 1114 of the sleeve 1108 correspond to the external threads 1156 of the shaft 1142 and threadingly engage the external threads 1156 of the shaft 1142. Because the handle 1040 is connected to the actuator 1140 via the control lever 1042, movement of the handle 1040 along the tracks 1064, 1066 causes the actuator 1140 to move upwardly and downwardly within the passageway 1112. For example, counter-clockwise movement of the handle 1040 (i.e., in the direction indicated by arrow 1158 shown in FIG. 16) may cause downward movement of the actuator 1140, while clockwise movement of the handle 1040 may cause upward movement of the actuator 1140.

Figure 17:
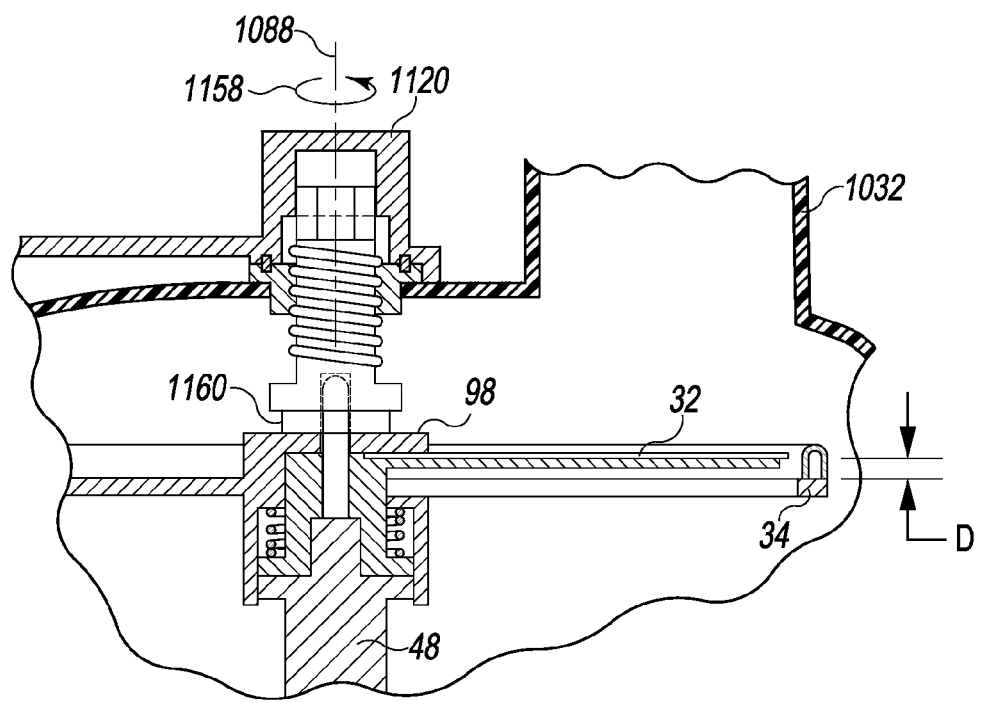
FIG. 17 another partial cross-sectional side elevation view of the food processor of FIGS. 14-16.

As shown in FIGS. 15 and 17, movement of the handle 1040 advances the lower end 1144 of the actuator 1140 into contact with an upper surface 98 of a hub 70 of the rotating disk 34 when the lid 1030 is secured to the bowl 1020. The lower end 1144 of the actuator 1140 is configured to be rotatively coupled to the rotating disk 34 such that the actuator 1140 does not rotate with the cutting assembly 16 as the cutting assembly 16 is driven by the motor 14. In the illustrative embodiment, the actuator 1140 has a bearing 1160 attached to the shaft 1142. The bearing 1160 is illustratively embodied as a thrust bearing that permits relative axial motion between the actuator 1140 and the rotating disk 34 while being loaded axially between the shaft 1142 and the rotating disk 34. It should be appreciated that in other embodiments the bearing 1160 may take other forms. It should also be appreciated that in other embodiments the bearing may be secured to the rotating disk rather than the shaft.

In use, the lid 1030 is secured to the bowl 1020 as shown in FIG. 15, and a user operates the controls 18 to energize the motor 14 to rotate the drive stem 48. Because the cutting assembly 16 is secured to the drive stem 48 via the central shaft 50, the motor 14 causes rotation of the cutting assembly 16. While the motor 14 is energized, the user may advance food items into the processing chamber 26 through the feed tube 1032 to be cut by the spinning cutting assembly 16.

Figure 16:
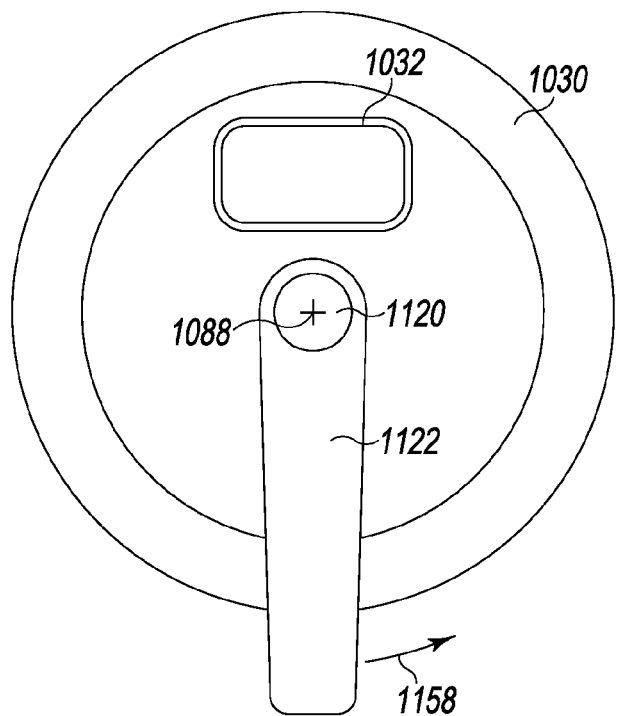
FIG. 16 is a top plan view of the food processor of FIGS. 14 and 15.

If the user desires to increase the cutting thickness during the cutting operation, the user may grasp the grip 1048 of the handle 1040 and advance the handle 1040 along the tracks 1064, 1066 in the direction indicated in FIG. 16 by arrow 1158. The rotation of the handle 1040 about the axis 1088 causes rotation of the cap 1120 of the control lever 1042. As the cap 1120 is rotated, the sidewalls of the socket 1148 engage the upper end 1146 of the actuator 1140, thereby causing the shaft 1142 to rotate and the actuator 1140 to advance downward. The lower end 1144 of the actuator 1140 engages the upper surface 98 of the hub 70 to move the rotating disk 34 downward relative to the cutting blade 32.

As shown in FIG. 17, the distance D defined between the cutting edge 36 and the upper surface 40 of the rotating disk 34 increases and thereby increases the thickness of food items being processed by the food processor 10. The bearing 1160 isolates the actuator 1140 from the rotation of the cutting assembly 16 and isolates the cutting assembly 16 from the rotation of the actuator 1140 such that only the vertical motion of the actuator 1140 is transferred to the rotating disk 34. In that way, the user may adjust the cutting thickness while the cutting assembly 16 is driven by the motor 14 without interfering with the cutting operation.

If the user desires to decrease the cutting thickness during the cutting operation, the user may grasp the grip 1048 of the handle 1040 and slide the handle 1040 in the direction opposite arrow 1158. As the handle 1040 is moved, the actuator 1140 is advanced upward, and the spring 92 of the cutting assembly 16 urges the rotating disk 34 to move upward relative to the cutting blade 32. As a result, the distance D defined between the cutting edge 36 and the upper surface 40 of the rotating disk 34 decreases, thereby decreasing the thickness of food items being processed by the food processor 1010.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 10 is herein illustrated as a conventional domestic food processor, the features and aspects disclosed herein can also be implemented in other types of food processing devices such as automatic food choppers, slicers, dicers, ice shavers and the like. Additionally, while the cutting assembly 16 was illustratively embodied as an adjustable slicing disk attachment, the concept of an adjustable cutting assembly 16 can also be implemented with other cutting attachments, such as, for example, a shedding disk, grate/shaving disk, julienne disk, and the like. Additionally, it should also be appreciated that in other embodiments the rotating disk may be vertically fixed and the cutting blade may be configured to move relative to the rotating disk to change the cutting thickness.

It should be further appreciated that the food processors described herein may include one or position markings that correspond to preset cutting positions for the cutting assembly. It should also be appreciated that each of the food processors may include a locking mechanism configured to inhibit movement of the thickness adjustment assembly and thereby maintain the cutting assembly at a particular cutting position.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A food processor comprising:
a base having a motor positioned therein,
a bowl removably coupled to the base, the bowl having a processing chamber defined therein,
a lid removably coupled to the bowl, the lid having a feed tube that opens into the processing chamber,
a cutting assembly positioned in the processing chamber and driven by the motor to cut food items advanced through the feed tube, the cutting assembly including a cutting blade and a rotating disk, the rotating disk being upwardly and downwardly moveable relative to the cutting blade between a plurality of cutting positions to produce cut food items of varying thicknesses, and an adjustment assembly secured to the lid, the adjustment assembly comprising an actuator configured to move upwardly and downwardly relative to the lid, the actuator having a first end positioned above an outer surface of the lid and a second end configured to be rotatively coupled to the rotating disk such that movement of the actuator relative to the lid causes the rotating disk to move between the plurality of cutting positions while the cutting assembly is driven by the motor;

wherein the actuator has a body that extends through the lid and a bearing that is positioned between the body and the rotating disk, the bearing being configured to permit the rotating disk to rotate relative to the body of the actuator; and wherein the adjustment assembly further comprises a user-operated control device moveable coupled to the lid, the user-operated control device including a pin that is moveable between (i) a first position in which the actuator is prevented from moving upwardly and downwardly relative to the lid, and (ii) a second position in which the actuator is permitted to move upwardly and downwardly relative to the lid.

2. The food processor of claim 1, further comprising:
a sleeve secured to the lid, the sleeve having an internally-threaded body,
wherein the body of the actuator is externally-threaded and is received in the internally-threaded body of the sleeve, and when the actuator is rotatively coupled to the rotating disk, (i) rotation of the body in a first direction causes the rotating disk to advance downward relative to the cutting blade and (ii) rotation of the body in a second direction causes the rotating disk to move upward relative to the cutting blade.

3. The food processor of claim 2, wherein:
the cutting assembly further includes a spring positioned between the cutting blade and the rotating disk, the spring biasing the rotating disk in a first cutting position to produce a food item having a first thickness, and
when the actuator is rotatively coupled to the rotating disk, rotation of the body of the actuator in the first direction causes the rotating disk to move downward relative to the cutting blade from the first cutting position to a second cutting position to produce a food item having a second thickness greater than the first thickness.

4. The food processor of claim 2, wherein the adjustment assembly further comprises a control knob secured to the first end of the actuator, the control knob having a grip positioned above the outer surface of the lid.

5. The food processor of claim 1, wherein the body of the actuator has a plurality of notches defined therein, and a tip of the pin is received in one of the plurality of notches when the pin is in the first position.

6. The food processor of claim 5, wherein the adjustment assembly further comprises a spring that biases the pin in the first position.

7. The food processor of claim 1, wherein the user-operated control device includes a control button secured to the pin, the control button being configured to slide along the outer surface of the lid.

8. The food processor of claim 7, wherein the adjustment assembly further comprises a user-operated button secured to the first end of the actuator, and the pin is configured to move to the second position when a predetermined amount of force is applied to the user-operated button.

9. The food processor of claim 1, wherein:
the rotating disk includes a planar body and a sleeve extending downwardly from a lower surface of the planar body, and
the cutting blade is coupled to a central shaft positioned in the sleeve of the rotating disk.

10. The food processor of claim 9, further comprising a drive stem connecting the cutting assembly to the motor, the drive stem having a keyed end that is received in a corresponding socket defined in the central shaft.

11. A food processor comprising:
a base having a motor positioned therein,
a bowl removably coupled to the base, the bowl having a processing chamber defined therein,
a lid removably coupled to the bowl, the lid having a feed tube that opens into the processing chamber,
a cutting assembly positioned in the processing chamber and driven by the motor to cut food items advanced through the feed tube, the cutting assembly including a cutting blade and a rotating disk, the rotating disk being upwardly and downwardly moveable relative to the cutting blade between a plurality of cutting positions to produce cut food items of varying thicknesses, and
an adjustment assembly moveably coupled to the lid, the adjustment assembly comprising (i) an actuator configured to move upwardly and downwardly relative to the lid, the actuator being configured to be rotatively coupled to the rotating disk, (ii) a user-operated control device positioned above an outer surface of the lid, the user-operated control device being operable to move the actuator relative to the lid such that the rotating disk is moved between the plurality of cutting positions when the actuator is rotatively coupled to the rotating disk and the cutting assembly is driven by the motor;
wherein the actuator has a body and a bearing positioned the body and the rotating disk, the bearing being configured to permit the rotate relative to the body; and
wherein the adjustment assembly further comprises a sliding beam coupled to the user-operated control device and configured to move along an inner surface of the lid, the sliding beam having an inclined surface in contact with body of the actuator such that movement of the sliding beam relative to the inner surface of the lid causes the actuator to move upwardly and downwardly relative to the lid.

12. The food processor of claim 11, wherein the user-operated control device includes a control button positioned above the outer surface of the lid and an arm extending through a slot defined in the lid, the arm connecting the control button to the sliding beam.

13. The food processor of claim 11, wherein:
the rotating disk includes a hub and a planar body extending outwardly from the hub,
the cutting blade is coupled to a central shaft positioned in a sleeve, and
the cutting assembly includes a spring positioned between a flange of the central shaft and the hub of the rotating disk, the spring biasing the rotating disk in a first cutting position to produce a food item having a first thickness.

14. The food processor of claim 13, wherein when the actuator is rotatively coupled to the rotating disk, downward movement of the actuator causes the rotating disk to move downward relative to the cutting blade from the first cutting position to a second cutting position to produce a second food item having a second thickness greater than the first thickness.

15. The food processor of claim 12, wherein the user-operated control device includes a control knob secured to a first end of the actuator above the outer surface of the lid.

16. The food processor of claim 12, wherein the user-operated control device includes a pin that is moveable between (i) a first position in which the actuator is prevented from moving upwardly and downwardly relative to the lid, and (ii) a second position in which the actuator is permitted to move upwardly and downwardly relative to the lid.

* * * * *